United States Patent
Shinjo et al.

(10) Patent No.: US 11,898,988 B2
(45) Date of Patent: Feb. 13, 2024

(54) MOLECULAR SENSOR, MOLECULAR DETECTION DEVICE, AND MOLECULAR DETECTION METHOD

(71) Applicant: KABUSHIKI KAISHA TOSHIBA, Tokyo (JP)

(72) Inventors: Yasushi Shinjo, Kawasaki (JP); Hirohisa Miyamoto, Kamakura (JP); Reiko Yoshimura, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 441 days.

(21) Appl. No.: 17/194,818

(22) Filed: Mar. 8, 2021

(65) Prior Publication Data

US 2021/0293756 A1    Sep. 23, 2021

Related U.S. Application Data

(63) Continuation-in-part of application No. 17/016,698, filed on Sep. 10, 2020, now abandoned.

(30) Foreign Application Priority Data

| Mar. 17, 2020 | (JP) | 2020-046744 |
| Aug. 7, 2020 | (JP) | 2020-134835 |
| Feb. 2, 2021 | (JP) | 2021-015049 |

(51) Int. Cl.
*G01N 29/02* (2006.01)
*B01L 3/00* (2006.01)
(Continued)

(52) U.S. Cl.
CPC .......... *G01N 29/022* (2013.01); *B01J 20/226* (2013.01); *B01L 3/5023* (2013.01);
(Continued)

(58) Field of Classification Search
CPC .......................... G01N 29/22; G01N 29/036
See application file for complete search history.

(56) References Cited

U.S. PATENT DOCUMENTS

| 8,480,955 B2 | 7/2013 | Yaghi et al. |
| 8,735,161 B2 | 5/2014 | Yaghi et al. |
(Continued)

FOREIGN PATENT DOCUMENTS

| JP | 2019-124700 A | 7/2019 |
| JP | 2020-98113 A | 6/2020 |
(Continued)

OTHER PUBLICATIONS

Biemmi, E. et al., "Direct growth of $Cu_2(BTC)_2(H_2O)_2 \cdot 2H_2O$ thin films on modified OCM-gold electrodes—Water sorrption isotherms," Microporous and Mesoporous Materials, vol. 114, 2008, 7 pages.
(Continued)

*Primary Examiner* — Douglas M Menz
(74) *Attorney, Agent, or Firm* — Oblon, McClelland, Maier & Neustadt, L.L.P.

(57) ABSTRACT

According to one embodiment, a molecular sensor contains a sensitive film in which a porous member and an ionic liquid coexist. The molecular sensor is capable of detecting a target molecule by measuring a change in physical quantity of the sensitive film due to adsorption of the target molecule to the sensitive film.

22 Claims, 11 Drawing Sheets

(51) Int. Cl.
    *B01J 20/22*     (2006.01)
    *G01N 29/036*     (2006.01)
    *G01N 29/024*     (2006.01)

(52) U.S. Cl.
    CPC ......... *G01N 29/024* (2013.01); *G01N 29/036* (2013.01); *B01L 2300/123* (2013.01); *G01N 2291/011* (2013.01); *G01N 2291/022* (2013.01); *G01N 2291/024* (2013.01); *G01N 2291/028* (2013.01)

(56) References Cited

U.S. PATENT DOCUMENTS

| | | | |
|---|---|---|---|
| 9,546,887 | B1 | 1/2017 | Talin et al. |
| 2012/0164029 | A1* | 6/2012 | Serban .................. G01N 33/004 422/82.01 |
| 2018/0003604 | A1 | 1/2018 | Shiba et al. |
| 2018/0202961 | A1 | 7/2018 | Sussner et al. |
| 2018/0266977 | A1 | 9/2018 | Hashizume |
| 2019/0225487 | A1 | 7/2019 | Bahar et al. |
| 2020/0110066 | A1* | 4/2020 | Kim ........................ D01F 6/44 |
| 2020/0191687 | A1 | 6/2020 | Shinjo et al. |

FOREIGN PATENT DOCUMENTS

| | | |
|---|---|---|
| WO | WO 2016/121155 A1 | 8/2016 |
| WO | WO 2018/136556 A1 | 7/2018 |

OTHER PUBLICATIONS

Chang, A. et al., "Affinity Ionic Liquids for Chemoselective Gas Sensing," Molecules, vol. 23, 2018, 20 pages.

Chavan, S. et al., "$H_2$ storage in isostructural UiO-67 and UiO-66 MOFs," Physical Chemistry Chemical Physics, vol. 14, 2012, 13 pages.

Chen, L.-H. et al., "High temperature ionic conduction mediated by ionic liquid incorporated within the metal-organic framework UiO-67(Zr)," Inorganic Chemistry Communications, vol. 81, 2017, 4 pages.

Chen, Y. et al., "Ionic Liquid/Metal-Organic-Framework Composite for $CO_2$ Capture: A Computational Investigation," The Journal of Physical Chemistry C, vol. 115, 2011, 7 pages.

Fei, H. et al., "Robust, Catalytic Metal-Organic Framework with Open 2,2'-Bipyridine Sites," ChemComm Accepted Manuscript, 2014, DOI: 10.1039/00xx00000x, 5 pages.

Fujie, K. et al., "Low temperature ionic conductor: ionic liquid incorporated within a metal-organic framework," Chemical Science, vol. 6, 2015, 5 pages.

Peng, Y. et al., "Room Temperature Batch and Continuous Flow Synthesis of Water-Stable Colvalent Organic Frameworks (COFs)," Chemistry of Materials, vol. 28, No. 14, 2016, 7 pages.

Polat, H. M. et al., "Unlocking $CO_2$ separation performance of ionic liquid/CuBTC composites: Combining experiments with molecular simulations," Chemical Engineering Journal, vol. 373, 2019, 11 pages.

Song, Y. et al., "Opportunities of Covalent Organic Frameworks for Advanced Applications," Advanced Science, vol. 6, 2019, 34 pages.

Yamagiwa, H. et al., "Detection of Volatile Organic Compounds by Weight-Detectable Sensors coated with Metal-Organic Frameworks," Scientific Reports, vol. 4, No. 6247, 2015, 6 pages.

Zeeshan, M. et al., "Core-Shell Type Ionic Liquid/Metal Organic Framework Composite: An Exceptionally High $CO_2/CH_4$ Selectivity," Journal of the American Chemical Society, vol. 140, 2018, 4 pages.

Erika Virmani et al., "On-Surface Synthesis of Highly Oriented Thin Metal-Organic Framework Films through Vapor-Assisted Conversion", Journal of the American Chemical Society (vol. 140, No. 14), 2018, pp. 4812-4819, DOI: 0.1021/jacs.7b08174.

* cited by examiner

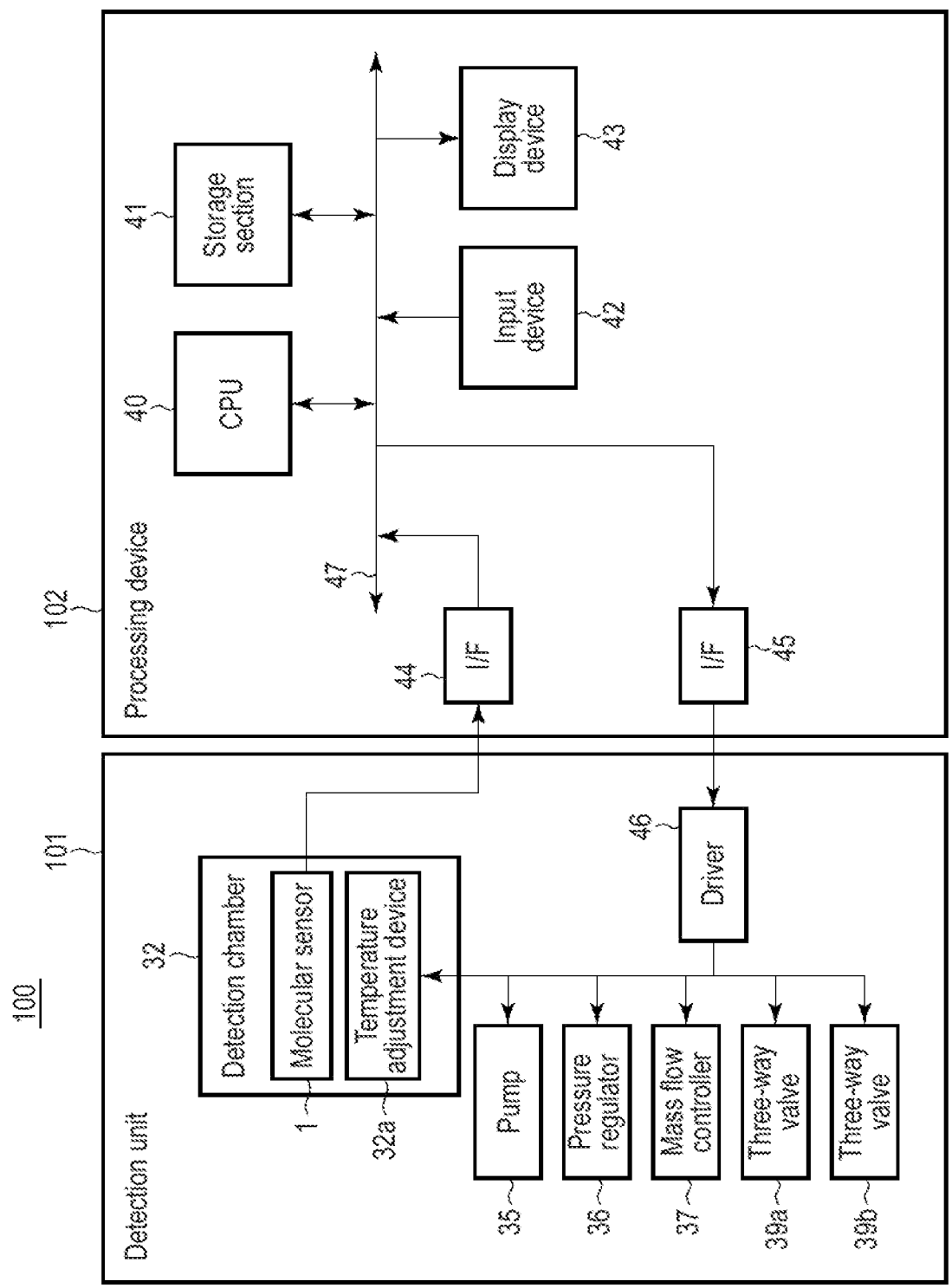
F I G. 7

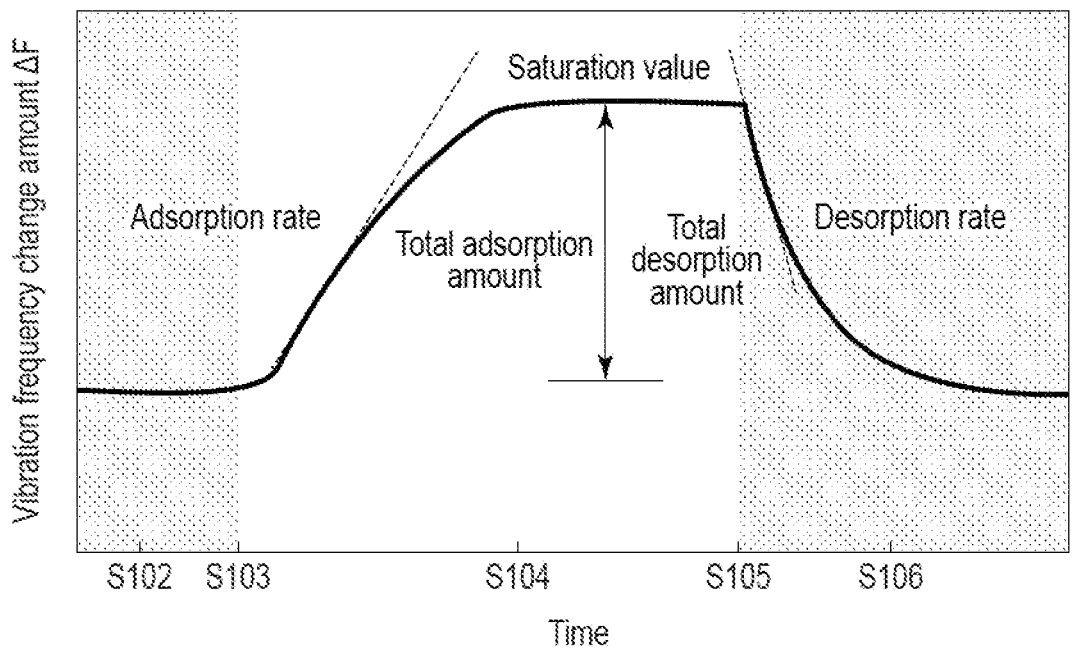
F I G. 9
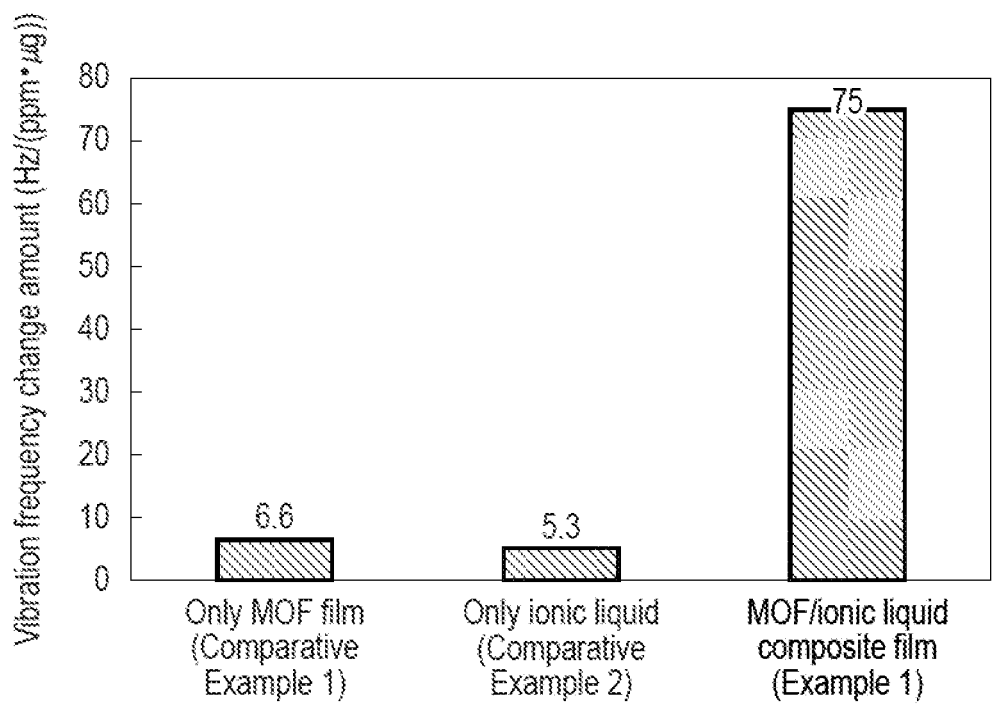
F I G. 10

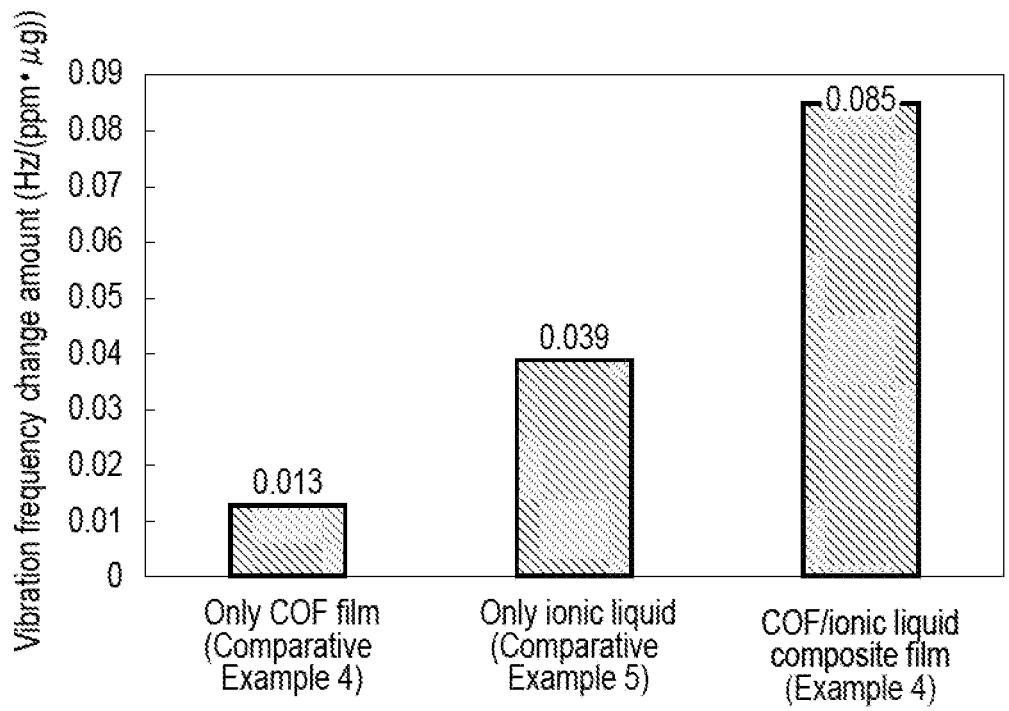
F I G. 13
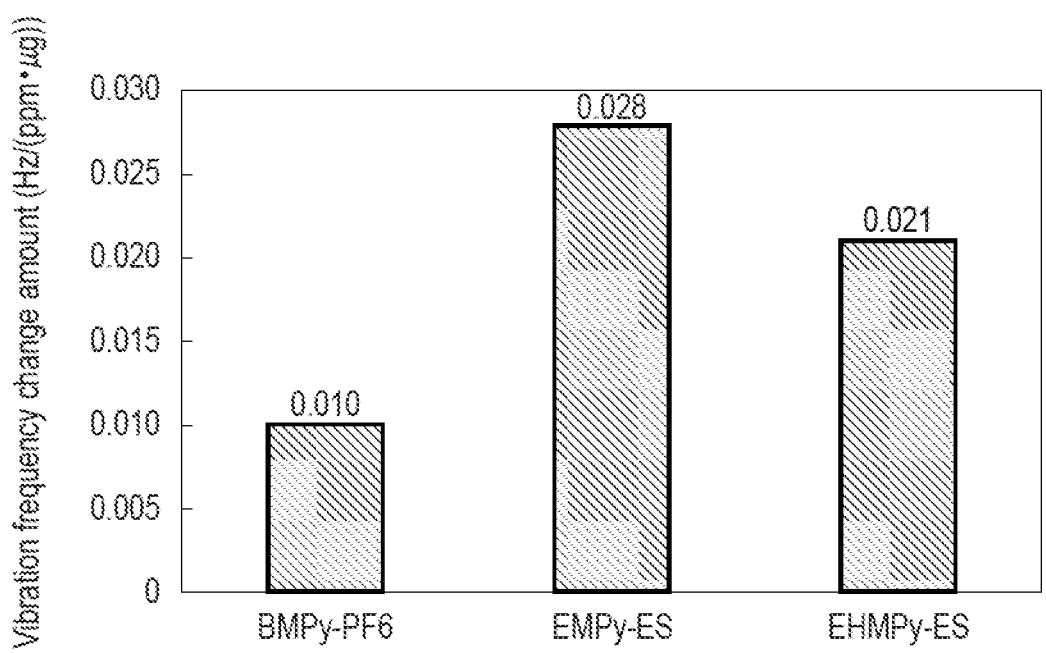
F I G. 14

MOLECULAR SENSOR, MOLECULAR DETECTION DEVICE, AND MOLECULAR DETECTION METHOD

CROSS-REFERENCE TO RELATED APPLICATIONS

This application is based upon and claims the benefit of priority from Japanese Patent Applications Nos. 2020-046744, filed Mar. 17, 2020 and 2020-134835, filed Aug. 7, 2020; U.S. patent application Ser. No. 17/016,698, filed Sep. 10, 2020; and Japanese Patent Application No. 2021-015049, filed Feb. 2, 2021, the entire contents of all of which are incorporated herein by reference.

FIELD

Embodiments described herein relate generally to a molecular sensor, a molecular detection device, and a molecular detection method.

BACKGROUND

Sensing technology using an odor (gas) sensor can digitize odors in the air. This technology is widely used for odor determination, measurement of volatile organic compounds (VOC) in the atmosphere, confirmation of performance of air purifiers, detection of troubles in devices, etc. In recent years, there has been an increasing interest in applications of detection of explosives, detection of narcotics and stimulants, which have hitherto relied on the sense of smell of dogs, diagnosis of specific diseases caused by exhalation, etc. Thus, high performance of the odor (gas) sensor is desired.

As conventional gas sensing devices, hydrogen flame ionization detector (FID), photo-ionization detector (PID), and infrared gas analyzer (Non-Dispersive Infra-Red: NDIR) are exemplified. In these devices, improvements in portability (miniaturization and weight reduction), safety, life of light source, price, and recognition of substances, etc., are required. Particularly, miniaturization is being developed because it is advantageous for incorporation into a processing device and use at a work site.

A semiconductor gas sensor, which is a representative of small sensors, measures gas concentration by utilizing changes in electrical properties such as electric resistance generated when oxygen adsorbed on a metal oxide is consumed by a reducing substance. In recent years, many kinds of metal oxides such as $SnO_2$, $ZnO_2$, $In_2O_3$, $WO_3$ and $V_2O_3$ have come to be used. In addition, studies have been conducted to achieve high sensitivity and improve selectivity by, for example, doping Pd, Pt, Au, Ag, etc., into these metal oxides. However, the sensitivity and selectivity are not yet sufficient.

On the other hand, from the viewpoint of further improving the sensitivity, selectivity, simplicity, quickness, reliability, stability, etc., of the odor (gas) sensor, mass detection sensors using a quartz crystal microbalance (QCM), surface acoustic wave (SAW), a micro cantilever (MCL), etc., have been drawing attention in recent years. For example, in the case of QCM, a sensor has been proposed in which a sensitive film that adsorbs a target molecule such as an organic polymer is formed on a device surface. When the target molecule is adsorbed on the sensitive film, the mass of the film increases, and the resonance frequency of a crystal oscillator changes. Since a frequency change amount is proportional to a mass of an adsorbed analyte molecule, the concentration of the analyte molecule can be measured.

The problem to be solved by the present invention is to provide a molecular sensor which has improved sensitivity and selectivity and can be easily reused, a molecular detection device, and a molecular detection method.

BRIEF DESCRIPTION OF THE DRAWINGS

FIG. 7 is a block diagram showing an example of the molecular detection device of the third embodiment.

FIG. 9 is a graph showing a vibration frequency change amount detected by the molecular detection device of the third embodiment.

FIG. 10 is a graph showing results of borneol detection experiments of Example 1, Comparative Example 1, and Comparative Example 2.

FIG. 13 is a graph showing results of ethyl acetate detection experiments of Example 4, Comparative Example 4, and Comparative Example 5.

FIG. 14 is a graph showing results of ethanol detection experiments of Example 5.

DETAILED DESCRIPTION

In general, according to one embodiment, a molecular sensor contains a sensitive film in which a porous member and an ionic liquid coexist. The molecular sensor is capable of detecting a target molecule by measuring a change in physical quantity of the sensitive film due to adsorption of the target molecule to the sensitive film.

Hereinafter, embodiments will be described with reference to the accompanying drawings. Note that, in each embodiment, substantially the same constituent parts are denoted by the same reference signs and an explanation thereof will be partly omitted in some cases. The drawings are schematic, and a relation of thickness and planer dimension of each part, a thickness ratio among parts, and so on are sometimes different from actual ones.

According to an embodiment, a molecular sensor for detecting a target molecule that may be contained in a sample is provided. The molecular sensor according to the embodiment includes a sensitive film in which a porous member and an ionic liquid coexist. A physical quantity of the sensitive film changes when the target molecule adhere to or is adsorbed to the sensitive film. The present molecular sensor may further include a detection unit that measures a change in the physical quantity of the sensitive film.

Here, the target molecule will be described. In the present specification, the "target molecule" refers to a molecule that can be detected by a molecular sensor according to a first embodiment. The "target molecule" does not necessarily refer to one type of molecule, but may refer to an mixture of a plurality of types of molecules. The mixture of a plurality of types of molecules may be, for example, a group of molecules that constitute one type of odor as a whole. The molecular sensor can detect or distinguish the mixture of a plurality of types of molecules.

First Embodiment

The molecular sensor of the first embodiment has a measurement mechanism using a quartz crystal microbalance (QCM) as a detection unit.

Figure 1:
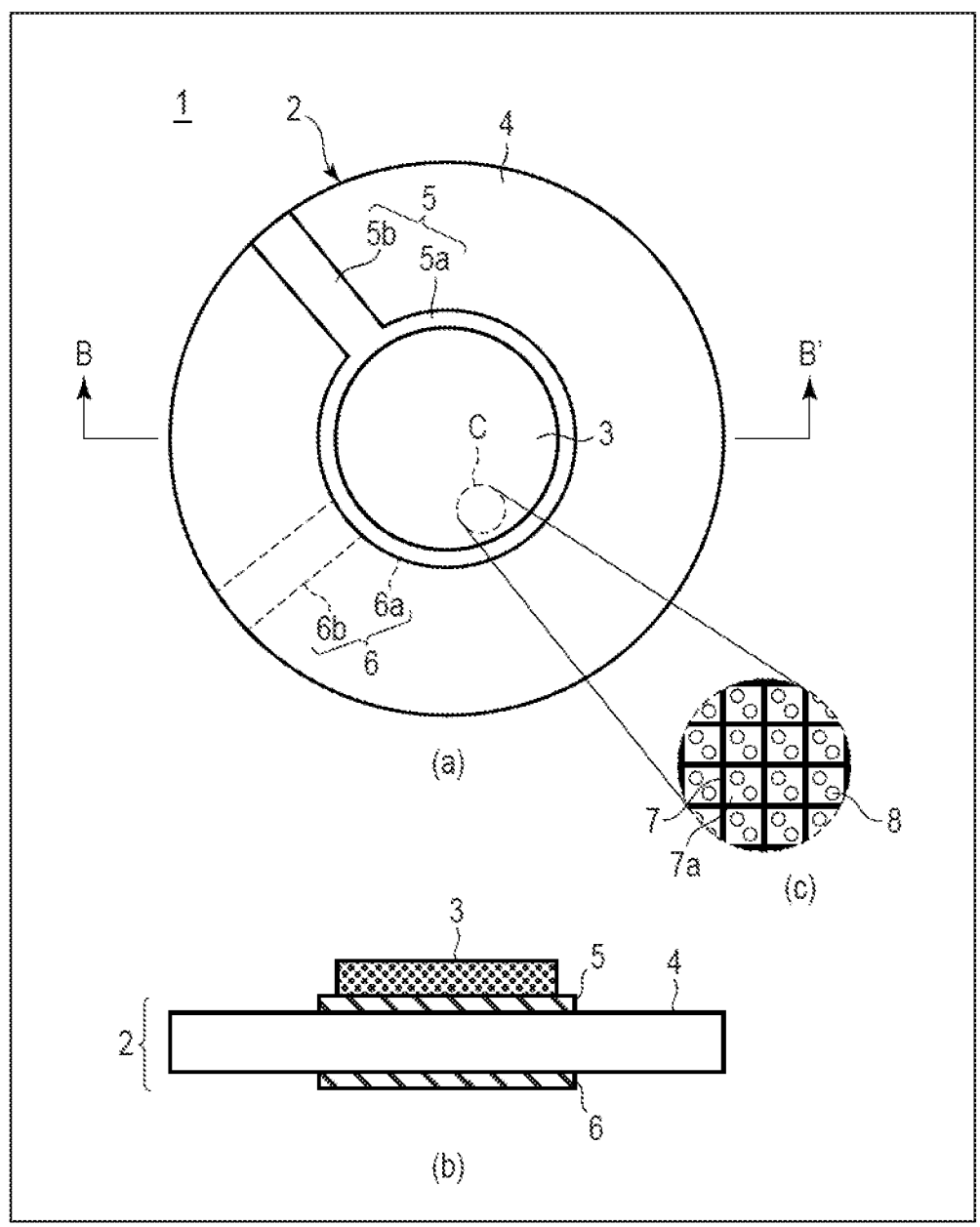
FIG. 1 is diagram showing an example of a molecular sensor of a first embodiment.

Part (a) to (c) of FIG. 1 show an example of a molecular sensor 1 of the first embodiment. Part (a) of FIG. 1 shows a plan view of the molecular sensor. Part (b) of FIG. 1 is a cross-sectional view taken along the line B-B' of part (a) of FIG. 1. Part (c) of FIG. 1 is an enlarged view of an enclosure C in part (a) of FIG. 1.

The molecular sensor 1 includes a QCM detection unit 2 and a sensitive film 3 provided on a surface of the QCM detection unit 2. The QCM detection unit 2 includes a disk-shaped quartz substrate 4, with two thin film electrodes, that is, an upper electrode 5 and a lower electrode 6, which are arranged with the quartz substrate 4 interposed between the electrodes. The upper electrode 5 includes, for example, as shown in part (a) of FIG. 1, an upper excitation portion 5a, which is concentric with the quartz substrate 4 and has a diameter smaller than that of the quartz substrate 4, and an upper lead portion 5b extending from a portion of a peripheral edge of the upper excitation portion 5a to a peripheral edge of the quartz substrate 4. The sensitive film 3 is provided, for example, on a surface (upper surface) of the upper excitation portion 5a. The lower electrode 6 includes a lower excitation portion 6a, which is concentric with the quartz substrate 4 and has a diameter smaller than that of the quartz substrate 4, and a lower lead portion 6b extending from a portion of a peripheral edge of the lower excitation portion 6a to a peripheral edge of the quartz substrate 4. According to a further embodiment, the sensitive film 3 may be provided on a surface (lower surface) of the lower excitation portion 6a.

As shown in an enlarged view (part (c) of FIG. 1), the sensitive film 3 includes a porous member 7 and an ionic liquid 8 held by the porous member 7.

The porous member 7 is made of a film-shaped porous material and has a large number of pores 7a. The size of the pore 7a is preferably about 50 nm or less in diameter. For example, the porous material is preferably a microporous material having micropores (diameter of about 2 nm or less) or a mesoporous material having mesopores (diameter of about 2 nm to about 50 nm).

The material of the porous member 7 is preferably a metal organic framework (MOF), a covalent organic framework (COF), an artificial zeolite, or the like. By using these materials, it is possible to easily grow and form an integrated film.

The MOF preferably has both high heat resistance and high water resistance. In particular, it is preferable to use MOF having a structure (below) in which 12 dicarboxylic acids coordinate to a hexanuclear $Zr_6O_4(OH)_4$ cluster.

In the above structure, ○ (white circle) indicates a $Zr_6O_4(OH)_4$ cluster, and a solid line indicates a dicarboxylic acid ligand.

As the MOF having such a structure, for example, at least one of UIO-66, UIO-67, UIO-68 and derivatives thereof is preferably used. UIO-66, UIO-67, and UIO-68 have structures in which dicarboxylic acid ligands are 1,4-benzenedicarboxylic acid, 4,4'-biphenyldicarboxylic acid, and 4,4"-terphenyldicarboxylic acid, respectively. The derivative is a derivative in which a new functional group is introduced into a benzene ring of the ligand contained in these MOFs. The functional group is, for example, an alkyl group, an amino group, a hydroxyl group, an alkoxy group, an amide group, an aldehyde group, an acyl group, an ester group, a carbonyl group such as a carboxyl group, and the like. The derivative is a derivative in which the benzene ring of the ligand is substituted with a heteroaromatic ring such as a pyridine ring or an imidazole ring. UIO-67 includes one substituted by a polycyclic aromatic compound such as 9-fluorenone-2,7-dicarboxylic acid, fluorene-2,7-dicarboxylic acid, or carbazole-2,7-dicarboxylic acid, instead of 4,4'-biphenyldicarboxylic acid.

These MOFs not only have high heat resistance and high water resistance, but also have a wide selection of film forming methods from fine crystals to thin films, and are easily applicable to the sensitive film 3. The MOFs are also excellent in that they are unlikely to cause dissolution, decomposition, and the like even when coming into contact with the ionic liquid 8. The hexanuclear $Zr_6O_4(OH)_4$ cluster may be partially or completely dehydrated by heating under reduced pressure or the like and converted into $Zr_6O_5(OH)_2$, $Zr_6O_6$, or the like. However, even with such a structure, the crystallinity is maintained and if necessary, those states can be chosen.

Besides, MOF such as MIL-53, MIL-101, MOF-74, ZIF-8, NU-1000 or CAU-24 can be used.

The COF preferably contains at least one of an imine bond, an azine bond, an enamine bond, a hydrazone bond, and an imide bond, obtained by a condensation reaction between a ligand having an amino group and a ligand having an aldehyde group or a carbonyl group. For example, it is preferable to use at least one of COF-LZU1, COF-300, TAPB-PDA-COF, COF-TpPa-1, DAAQ-TFP-COF, $N_3$-COF, ACOF-1, COF-42, COF-43, PI-COF-1, PI-COF-2, PI-COF-3, PI-COF-4 or the PI-COF-5 or the like as COF.

Chemical structures of the COF listed above will be provided.

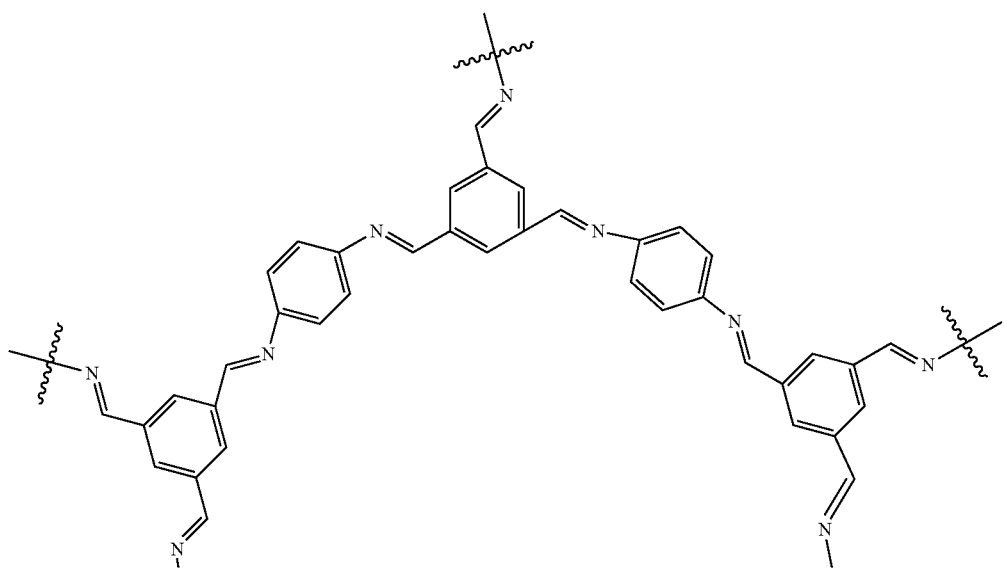
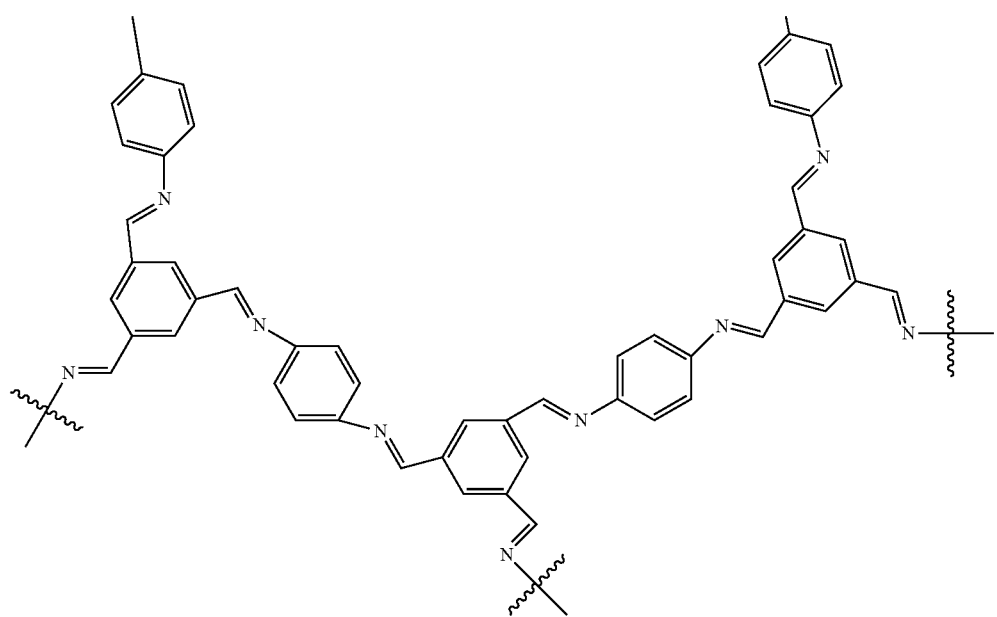
COF-LZU1

-continued
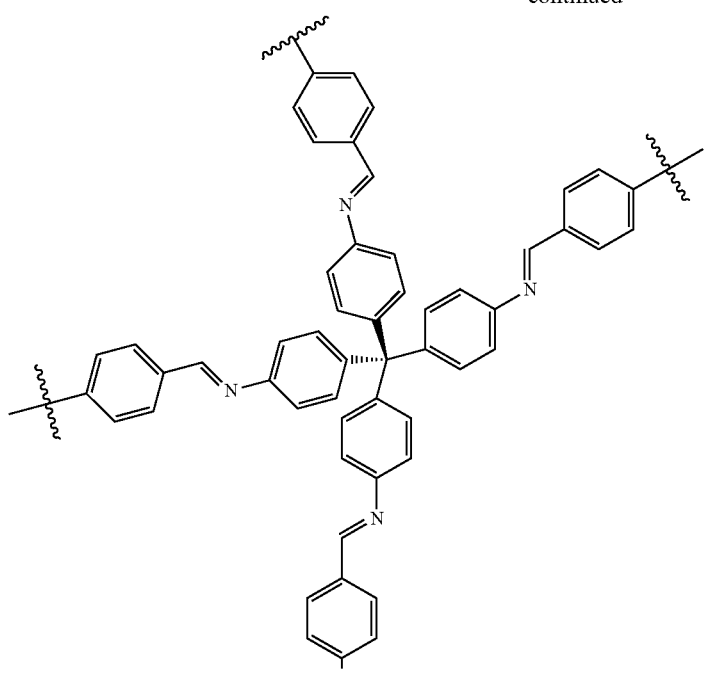
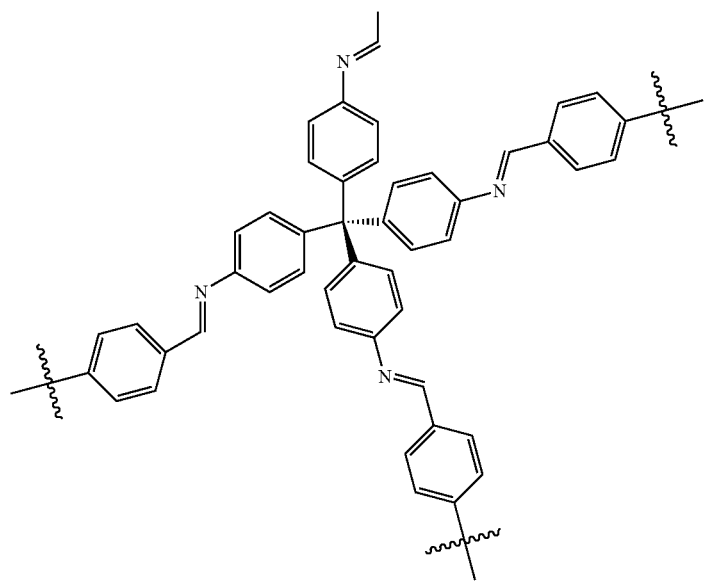
COF-300

-continued
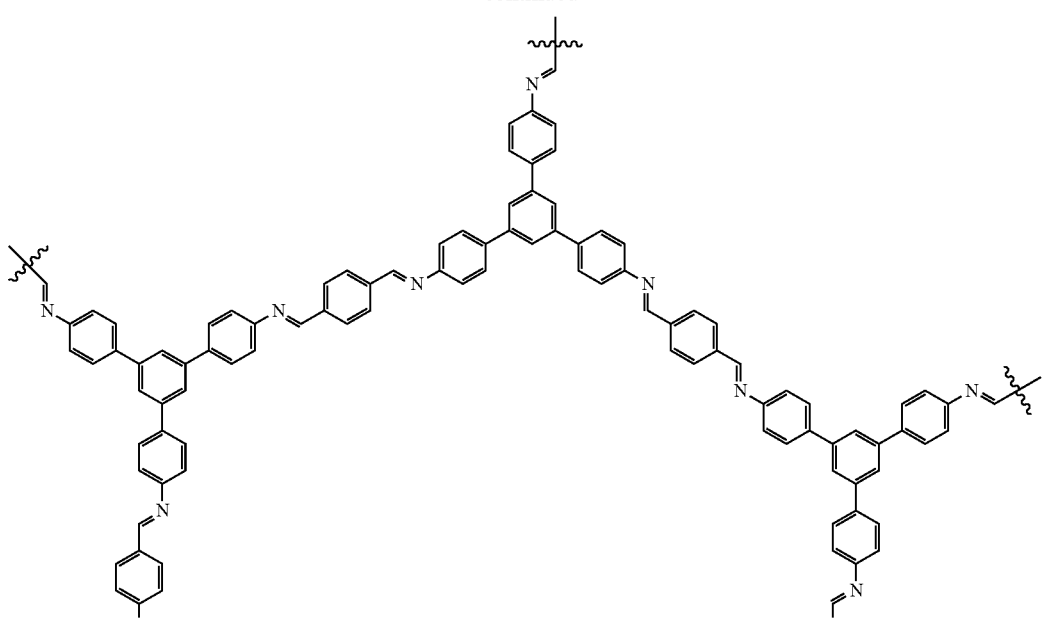
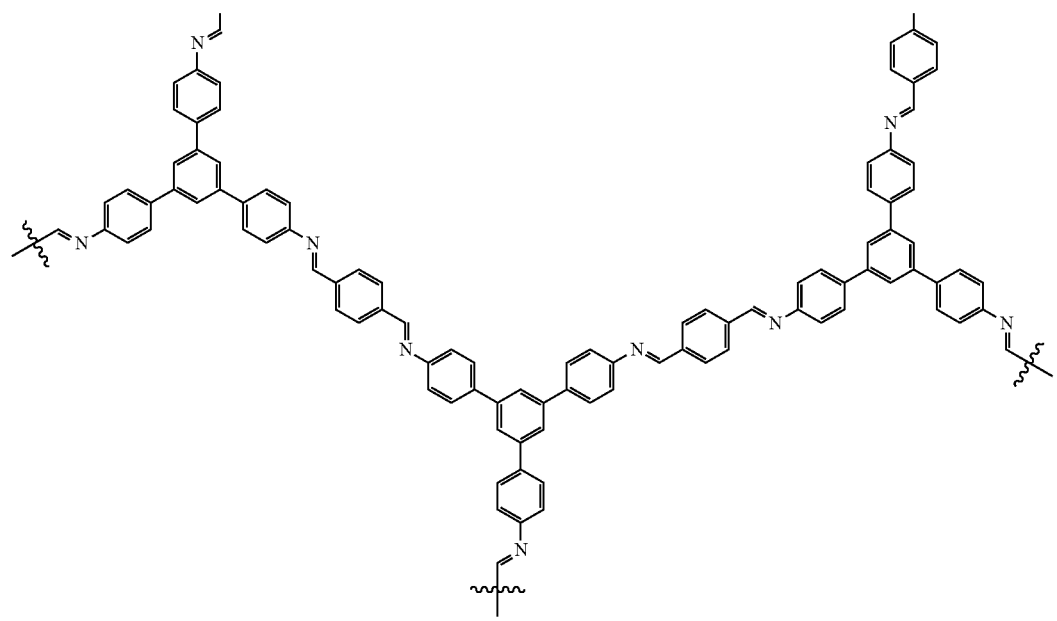
TAPB-PDA-COF

-continued
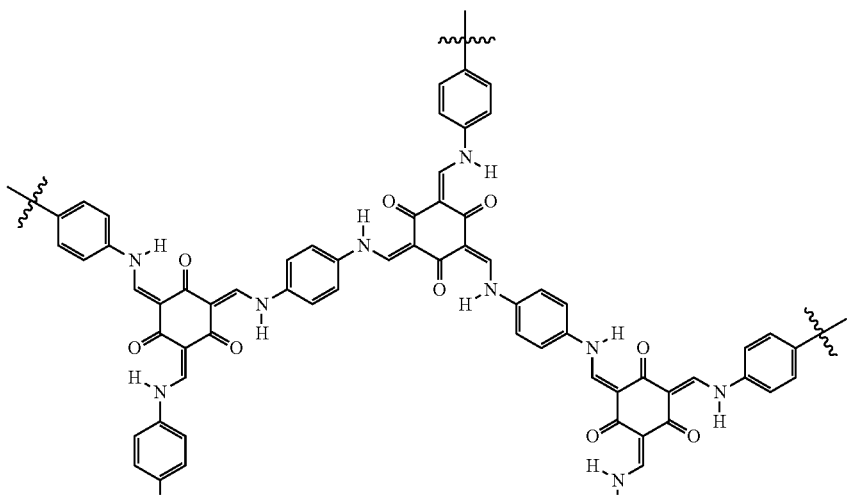
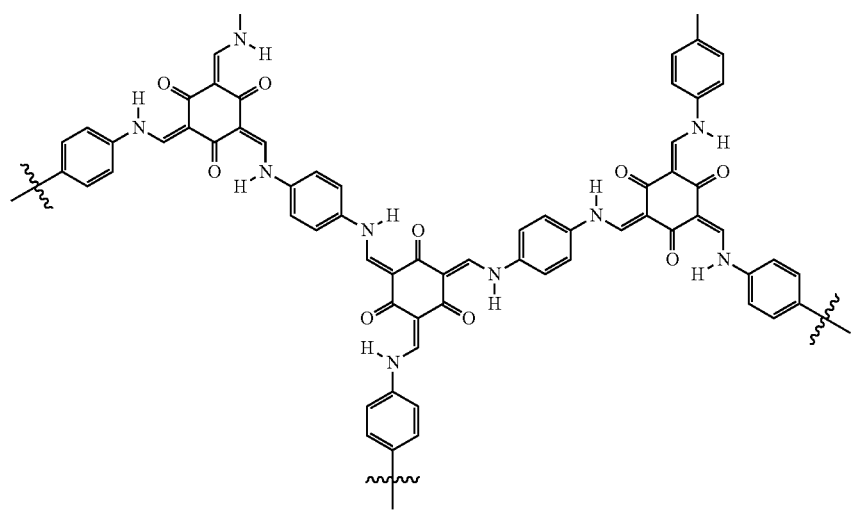
COF-TpPa-1

-continued
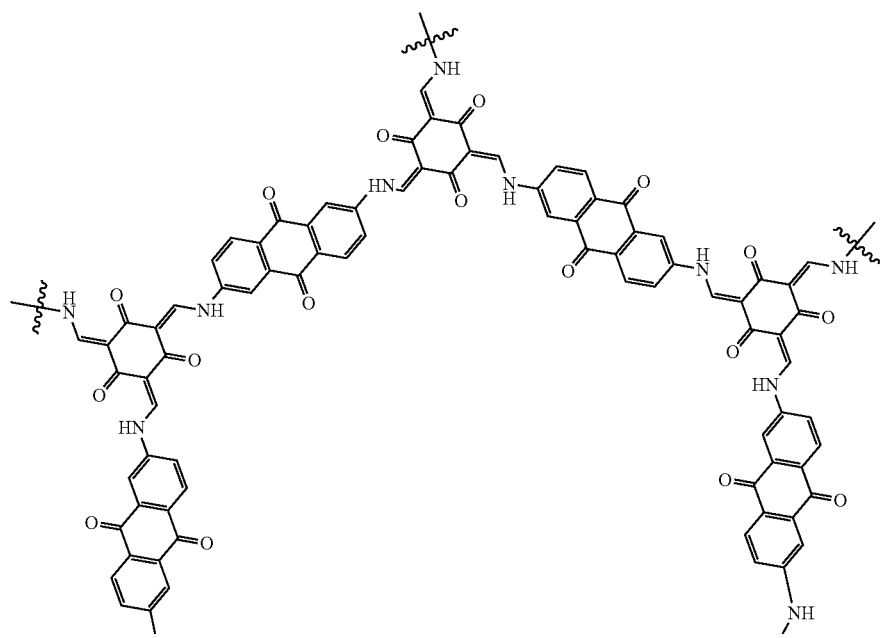
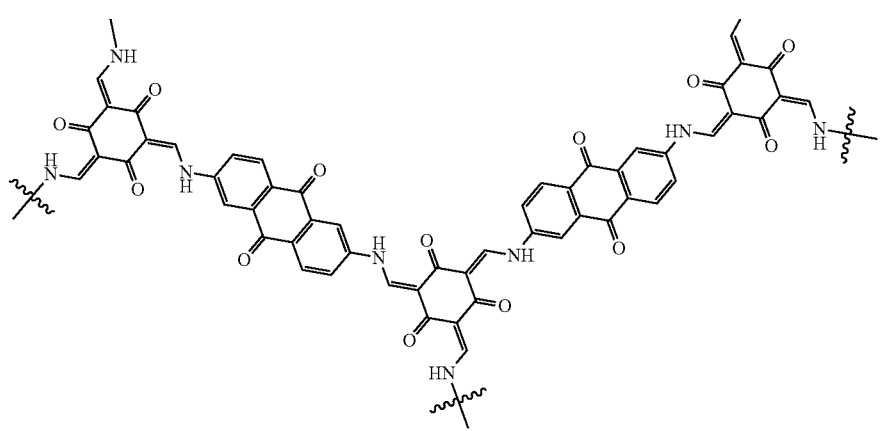
DAAQ-TFP-COF

-continued
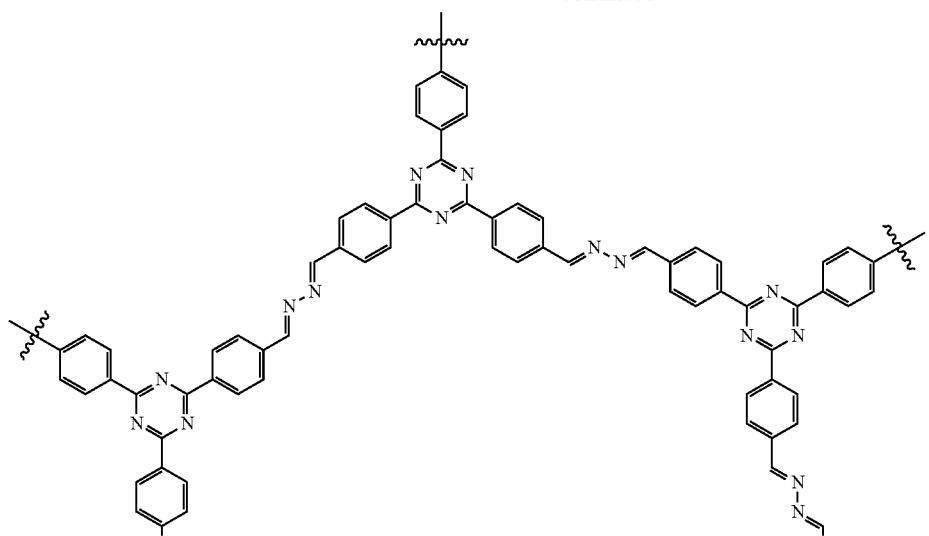
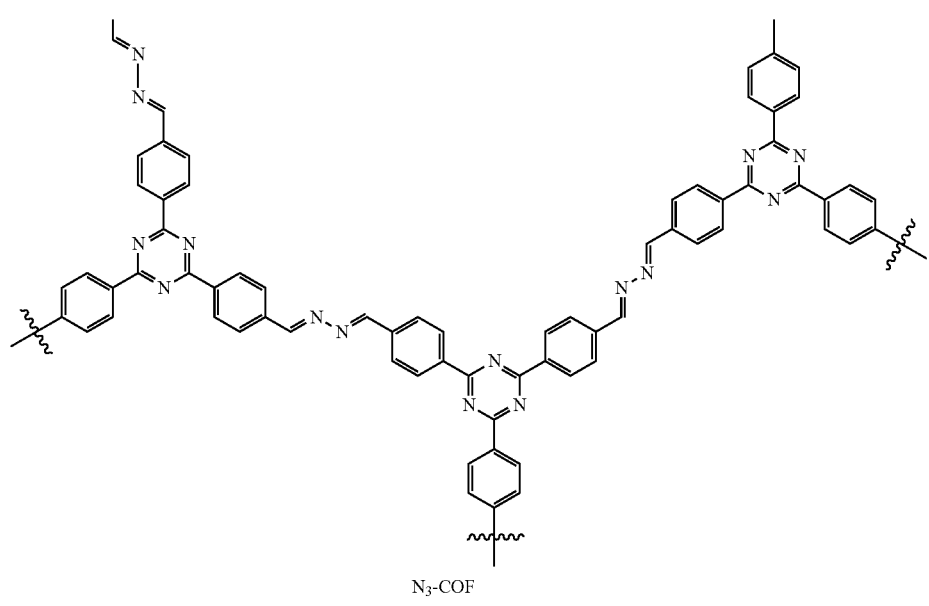
N₃-COF

-continued
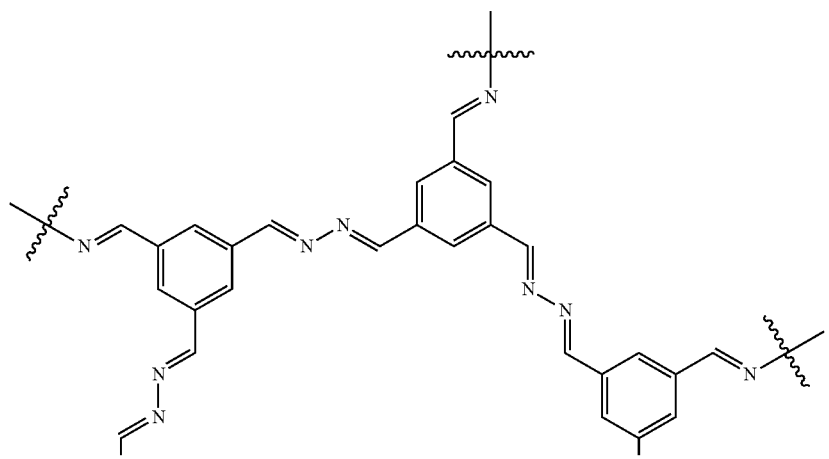
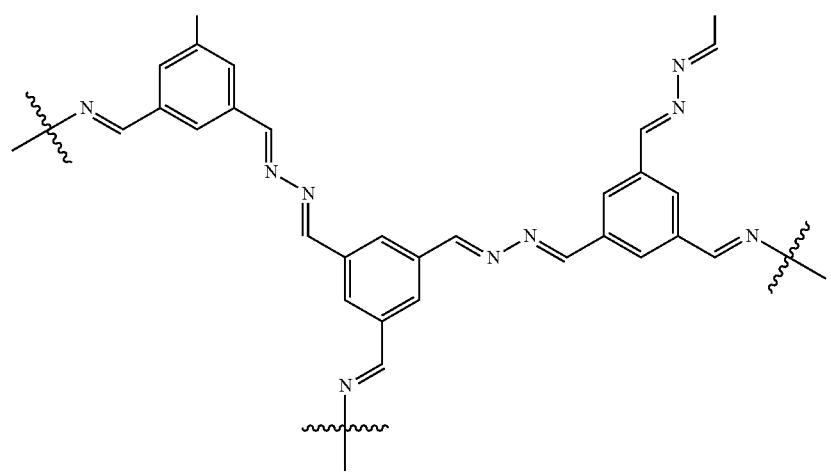
ACOF-1

-continued
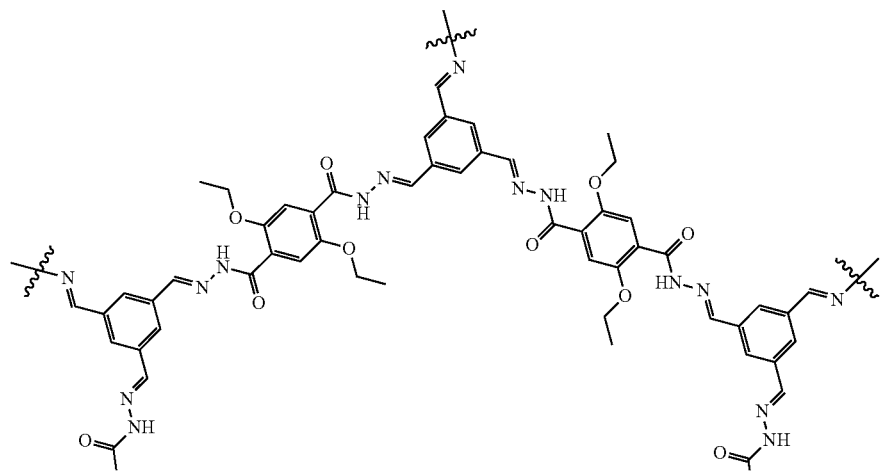
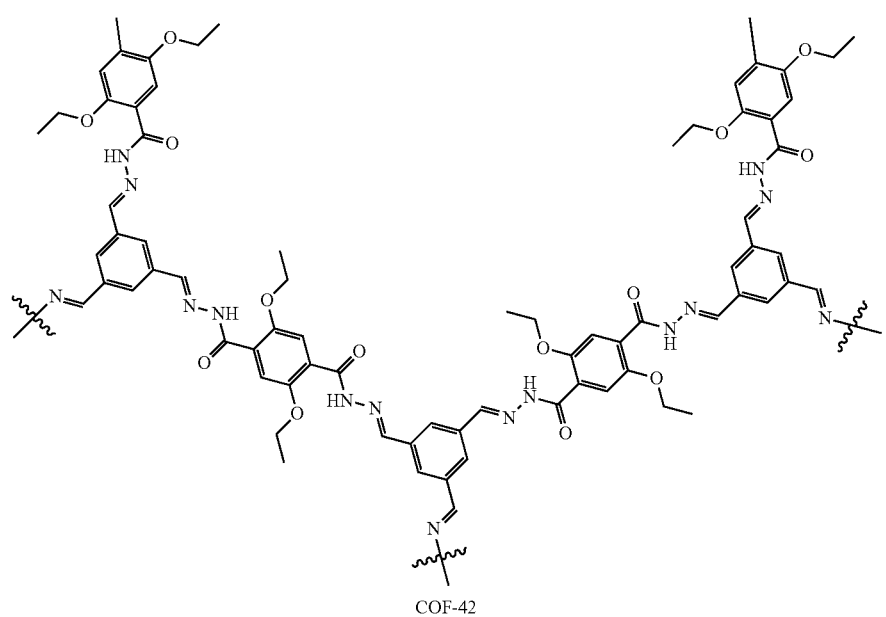
COF-42

-continued
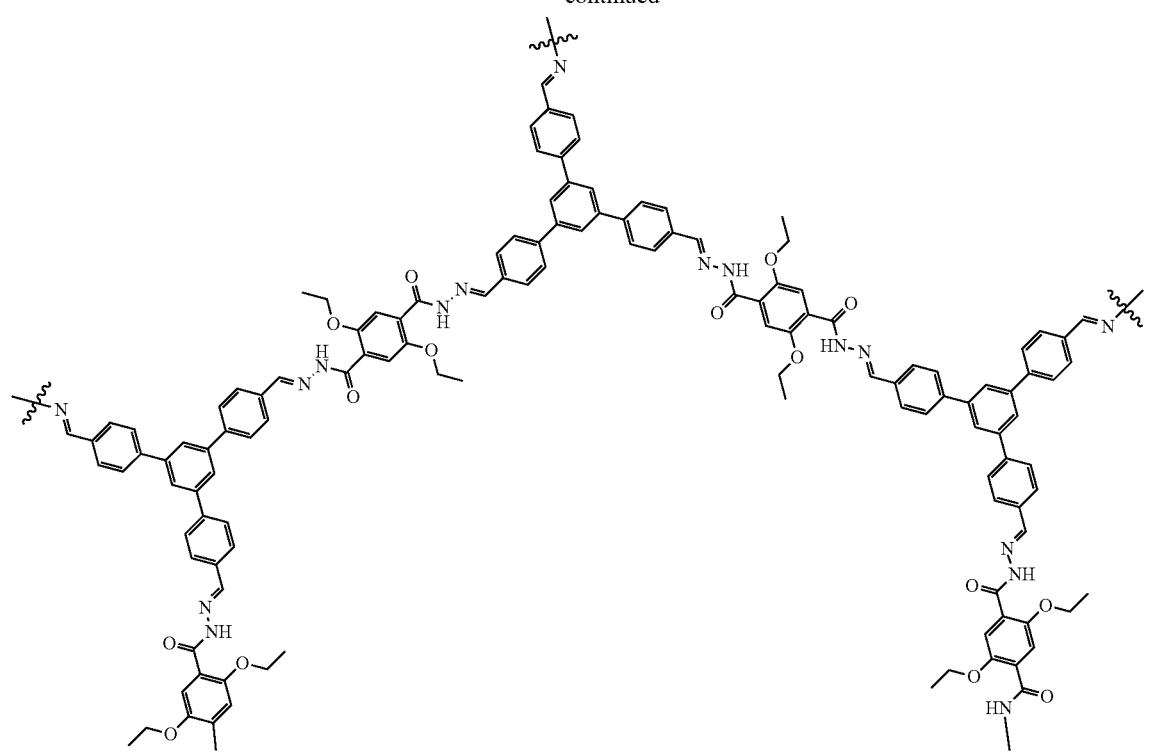
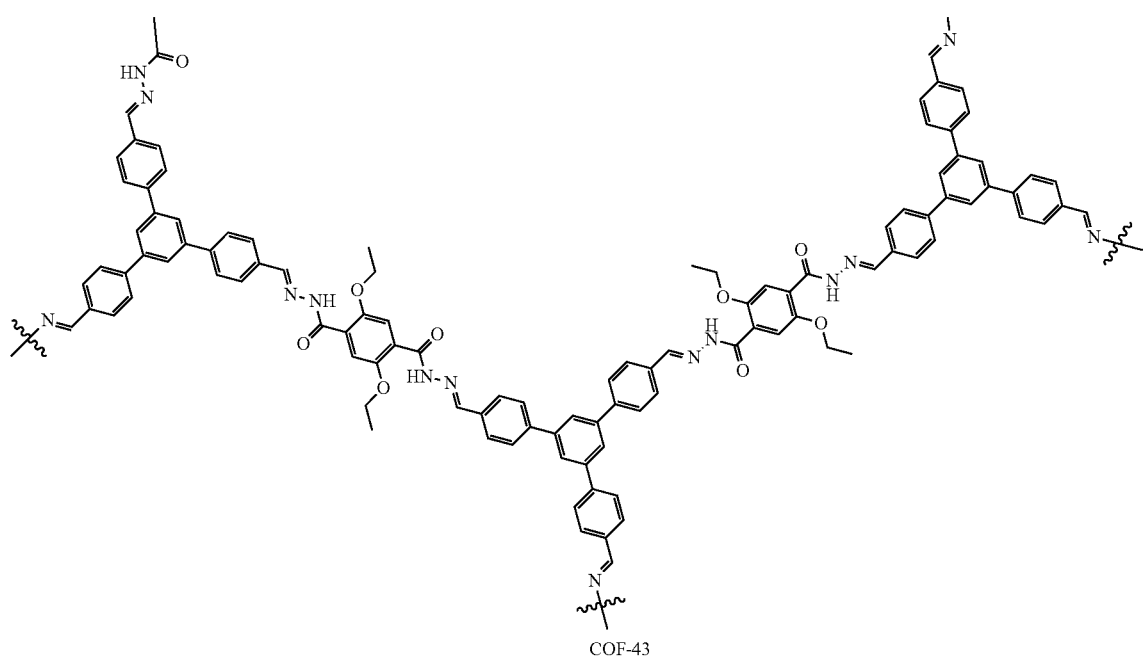
COF-43

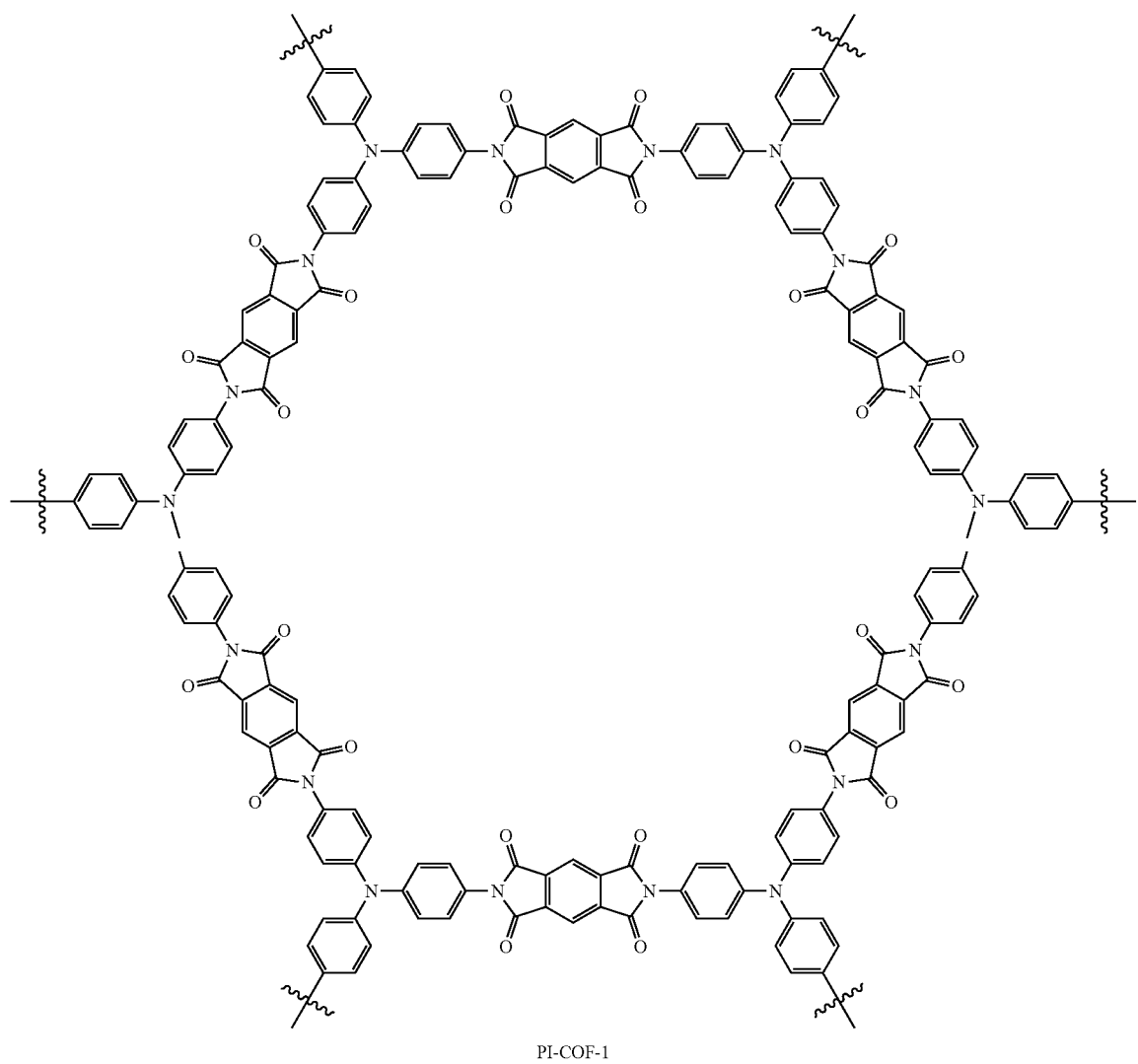 [SMILES: *c1ccc(-n2c3ccc(cc3)n3c(=O)c4cc5c(=O)n(c(=O)c5cc4c3=O)c3ccc(cc3)n(-c3ccc(*)cc3)c3ccc(cc3)n3c(=O)c4cc5c(=O)n(c(=O)c5cc4c3=O)c3ccc(cc3)n(-c3ccc(*)cc3)c3ccc(cc3)n3c(=O)c4cc5c(=O)n(c(=O)c5cc4c3=O)c3ccc(cc3)n(-c3ccc(*)cc3)c3ccc(cc3)n3c(=O)c4cc5c(=O)n(c(=O)c5cc4c3=O)c3ccc(cc3)n(-c3ccc(*)cc3)c3ccc(cc3)n3c(=O)c4cc5c(=O)n(c(=O)c5cc4c3=O)c3ccc(cc3)n(-c3ccc(*)cc3)c3ccc(cc3)n3c(=O)c4cc5c(=O)n(c(=O)c5cc4c3=O)c3ccc2cc3)cc1]
PI-COF-1
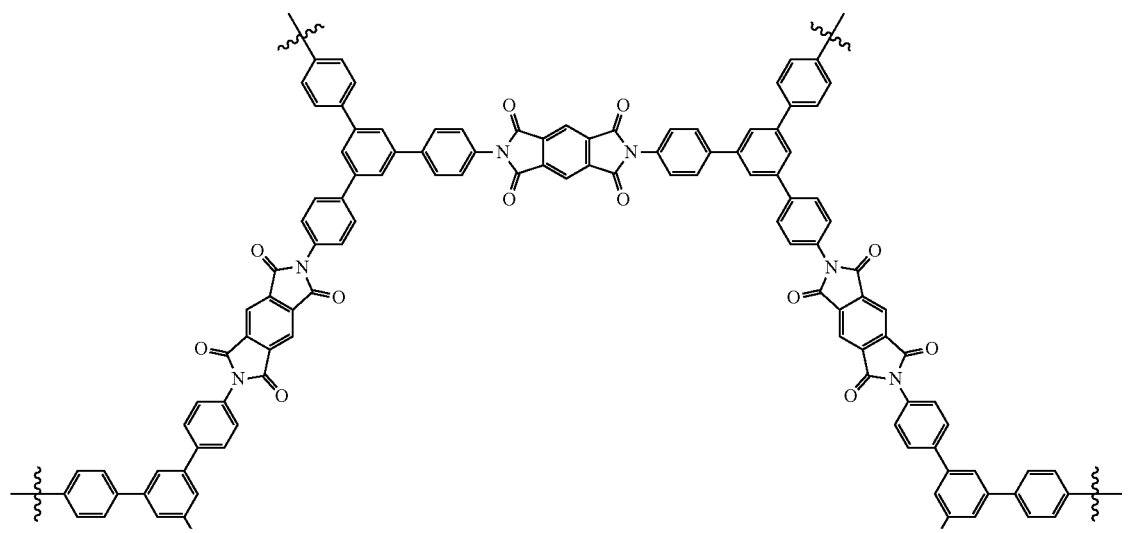

-continued
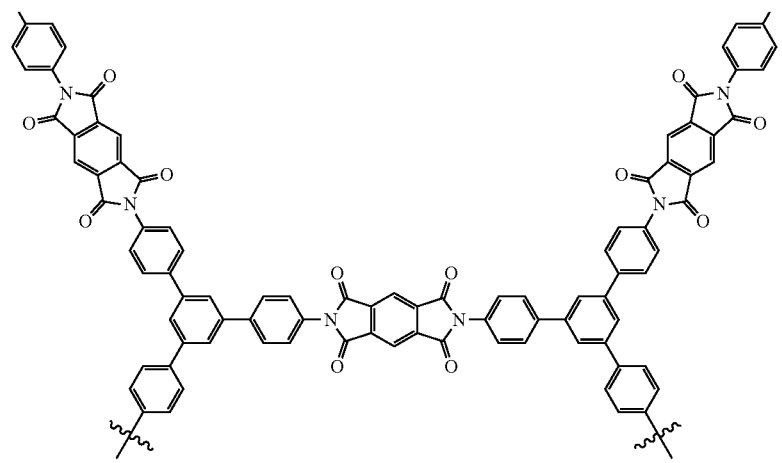
PI-COF-2
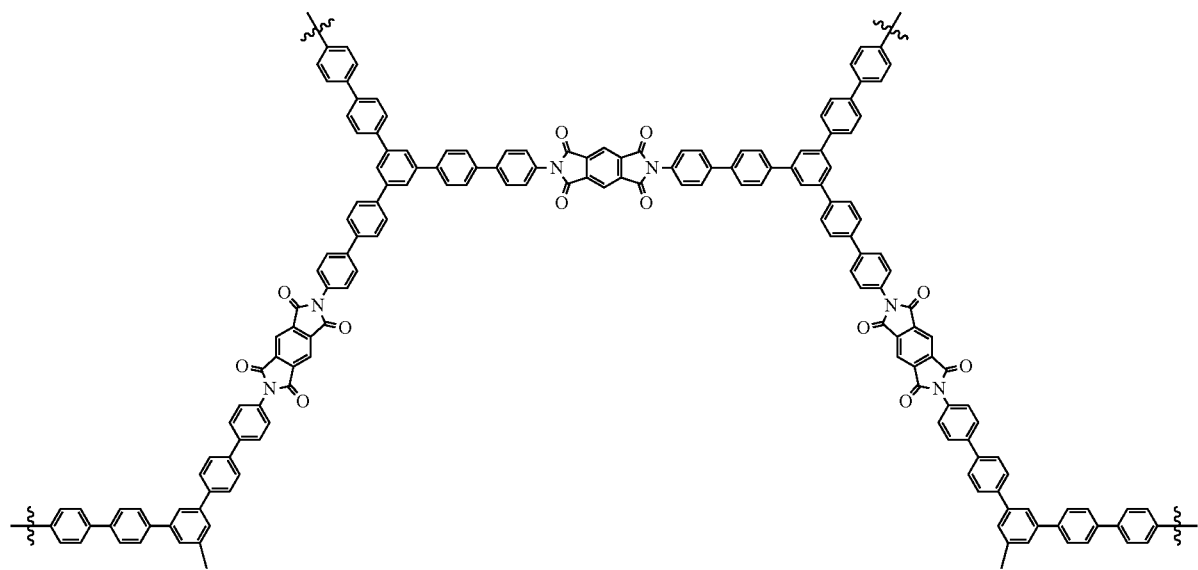

-continued
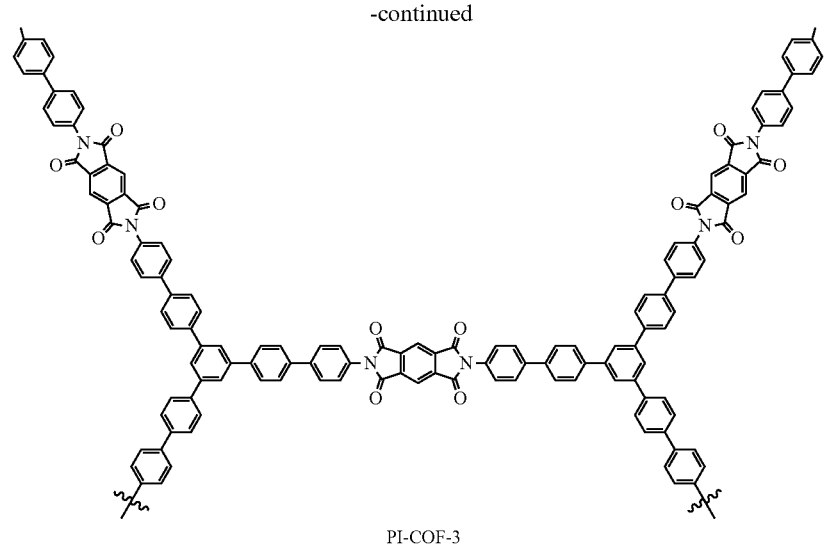
PI-COF-3
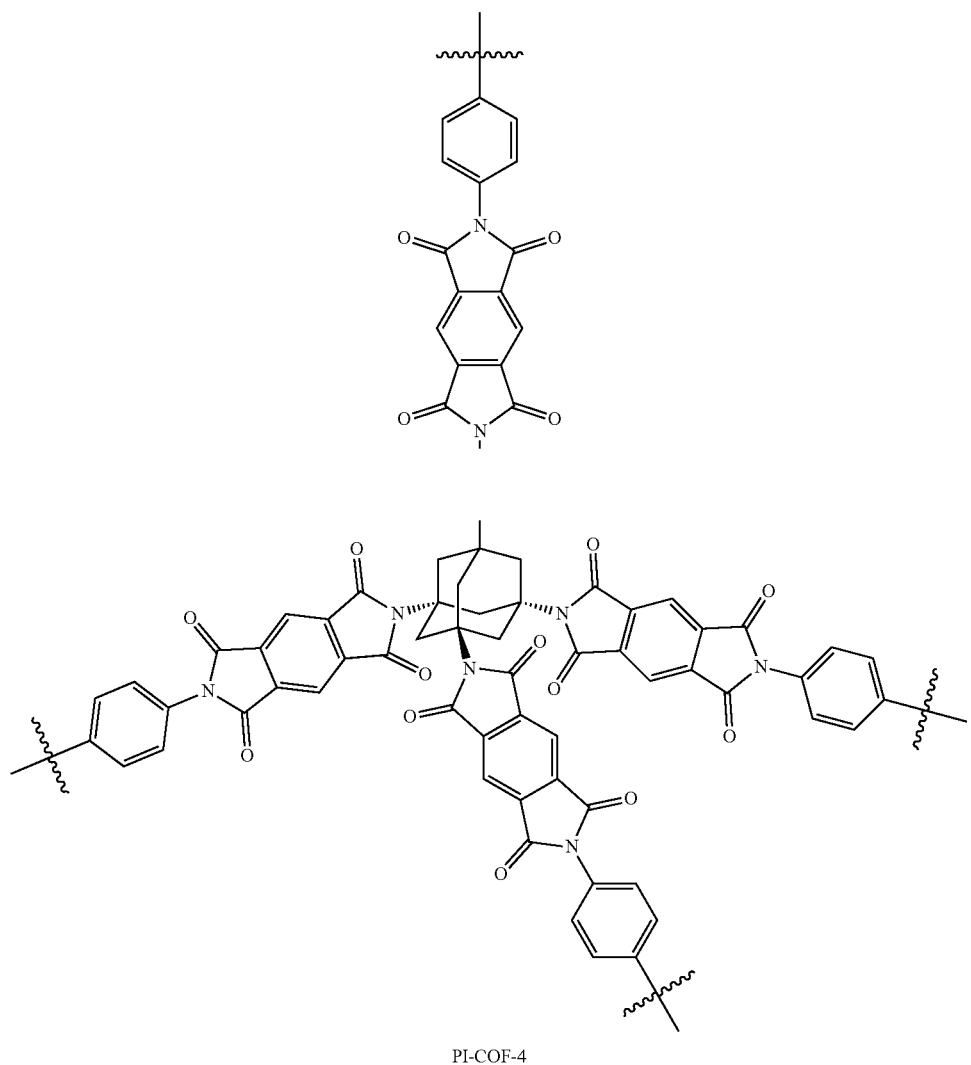
PI-COF-4

-continued
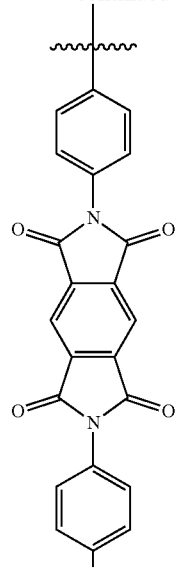
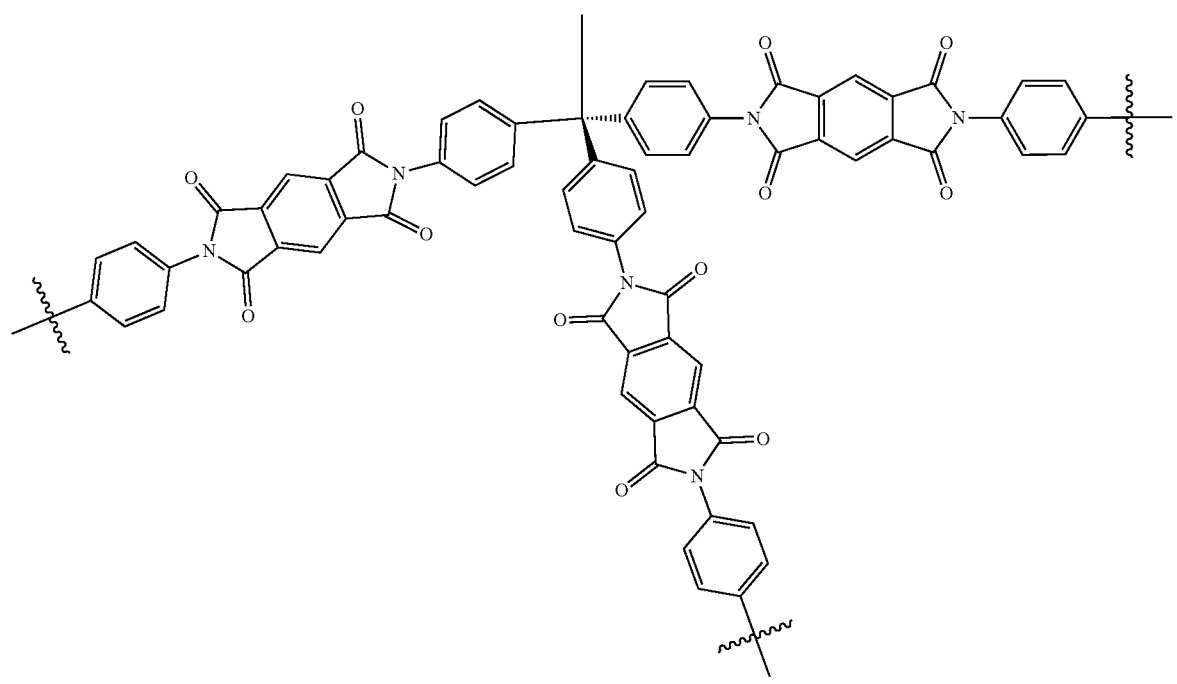
PI-COF-5
The imine bond, azine bond, enamine bond, hydrazone bond or imide bond contained in the COFs listed above will be provided.

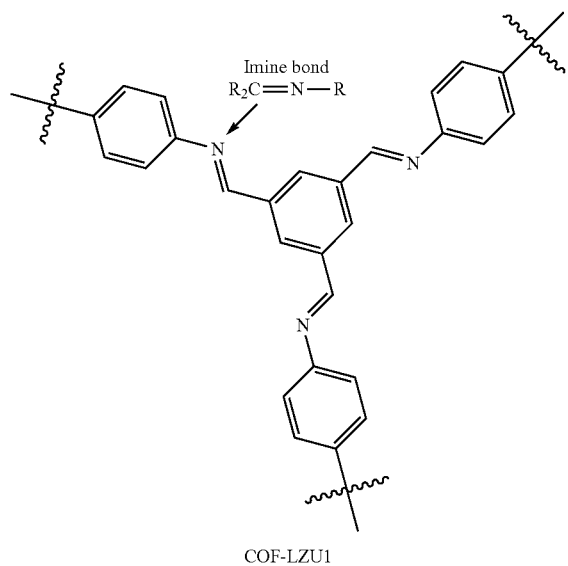
COF-LZU1
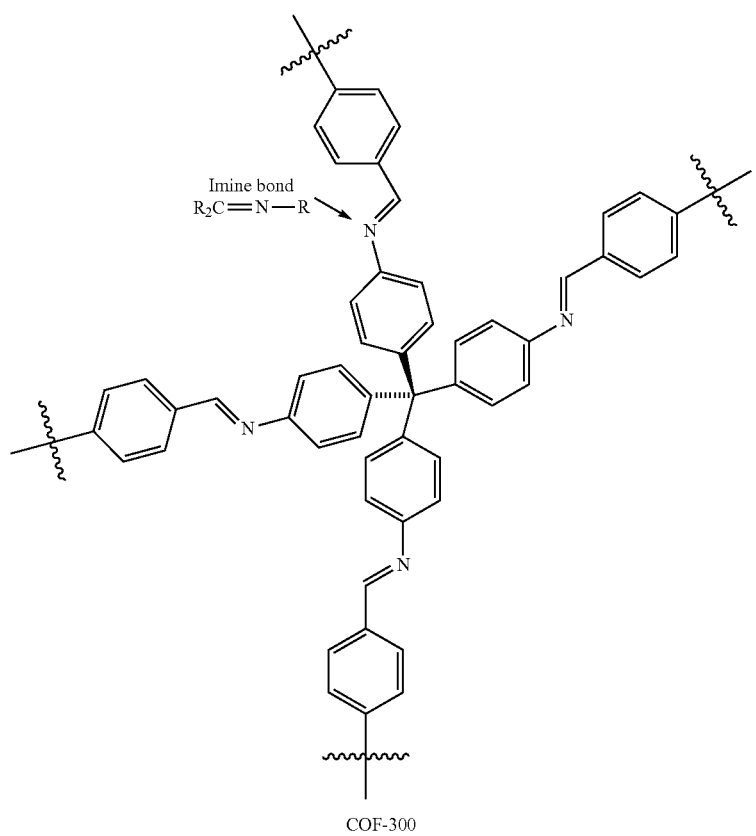
COF-300

-continued
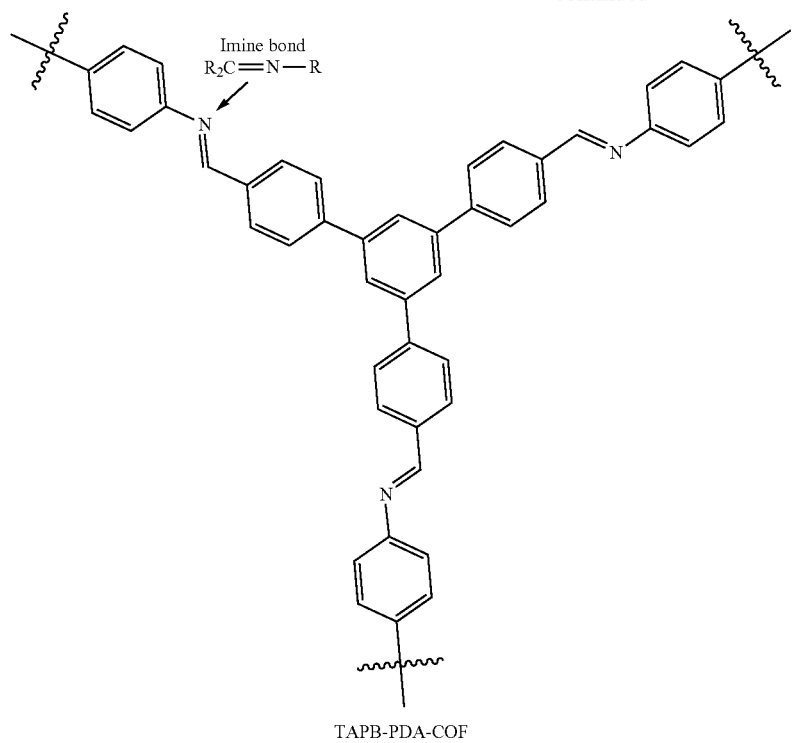
TAPB-PDA-COF
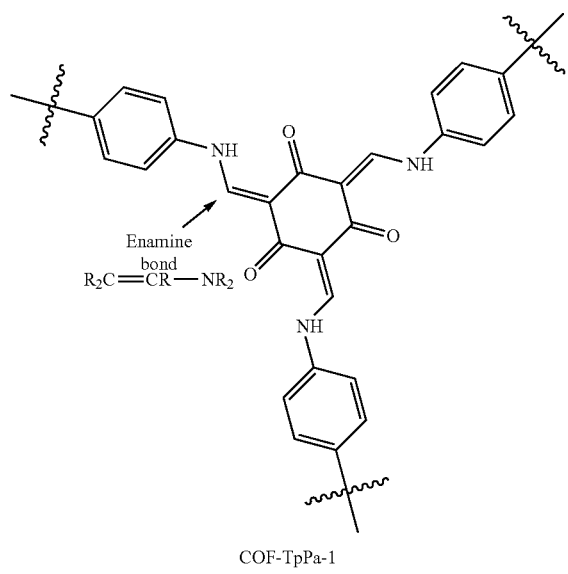
COF-TpPa-1

-continued
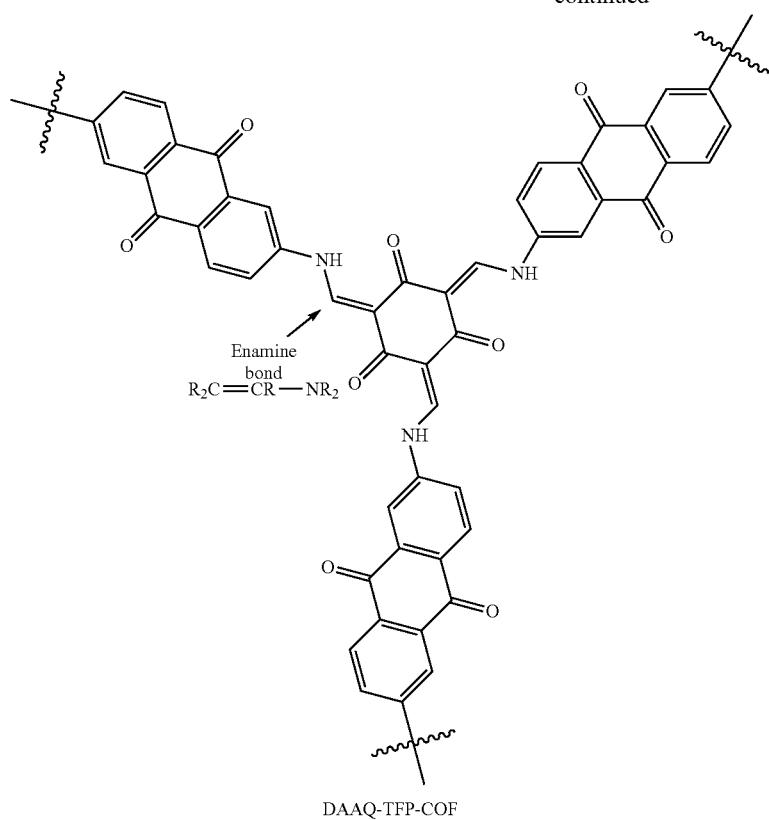
DAAQ-TFP-COF
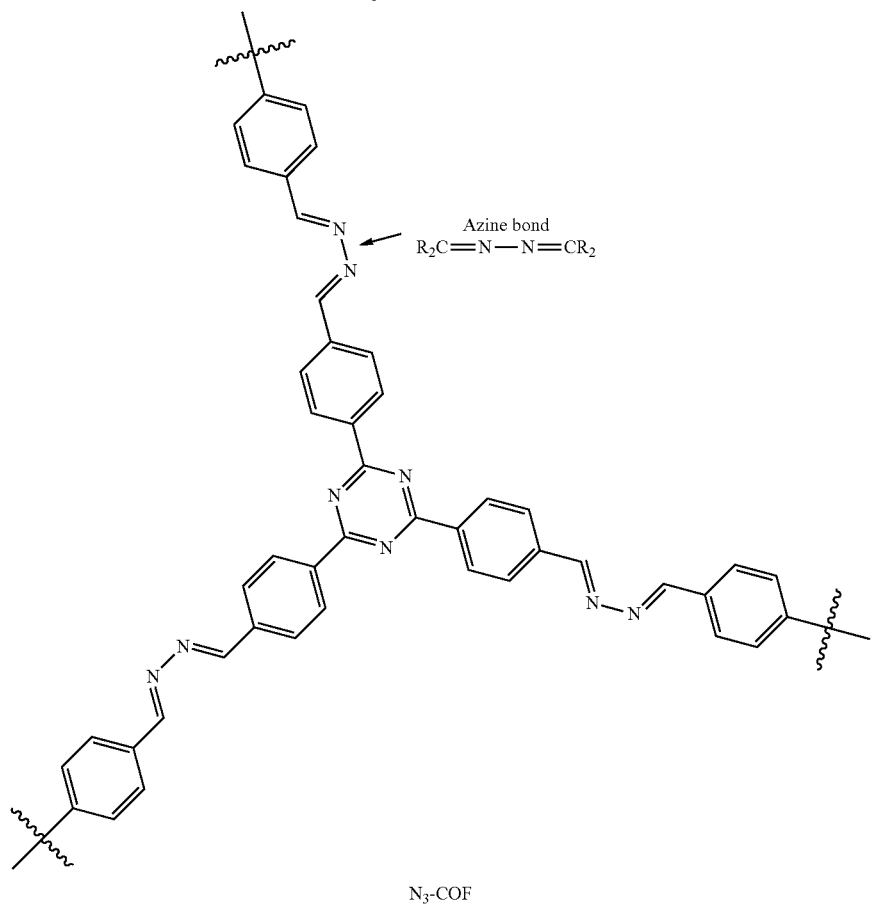
N₃-COF

-continued
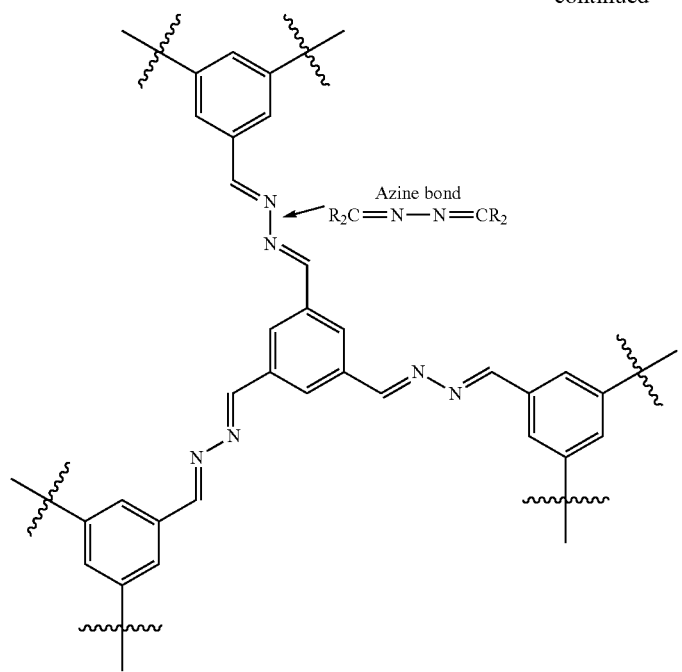
ACOF-1
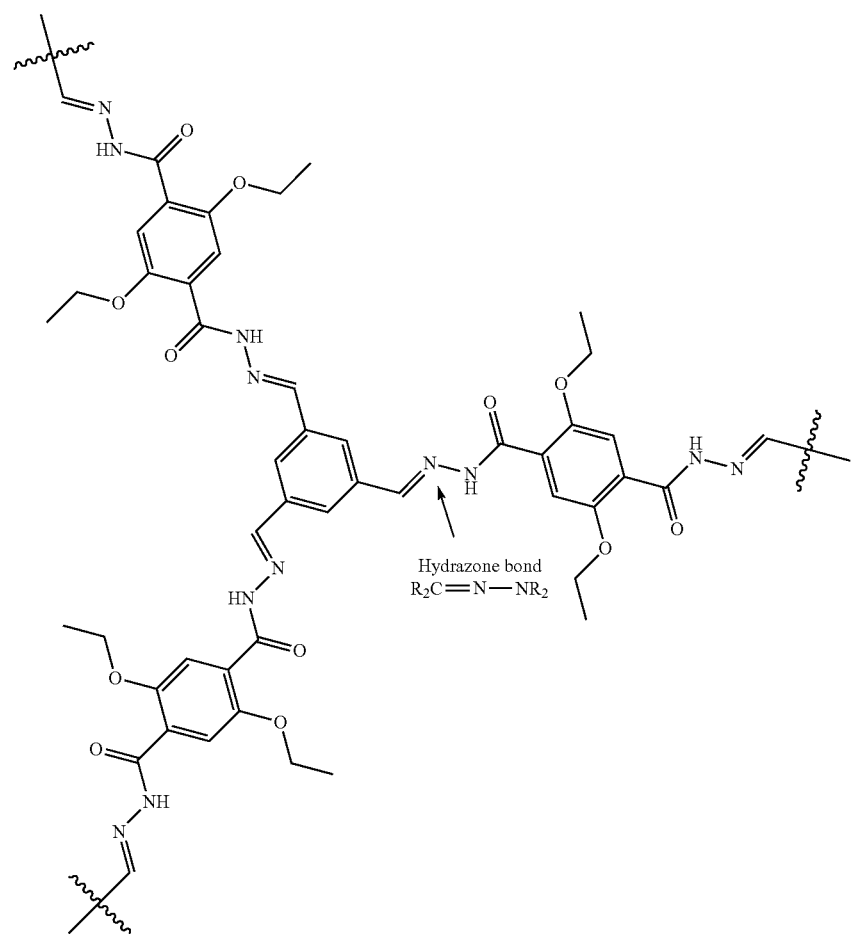
COF-42

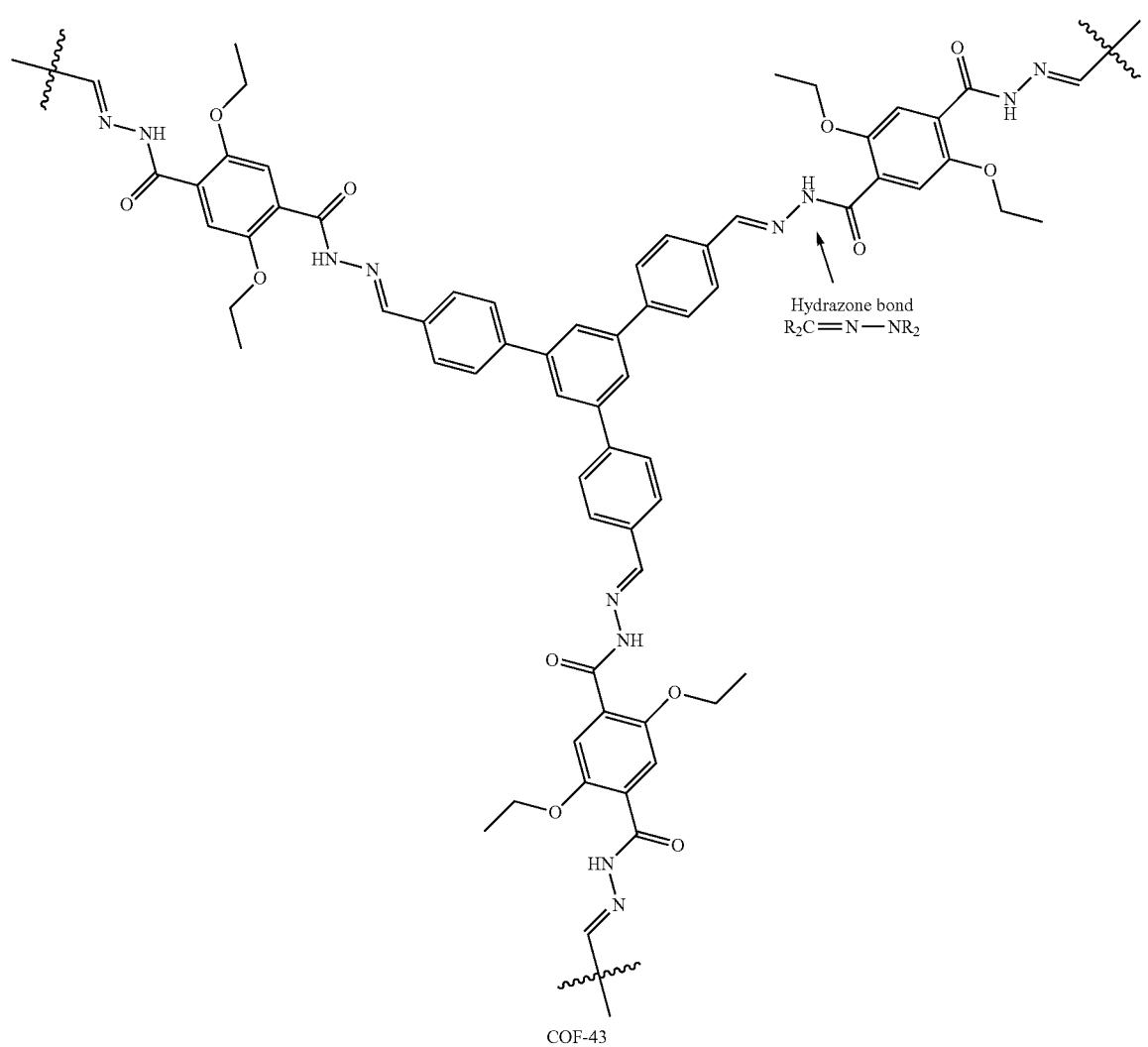
COF-43

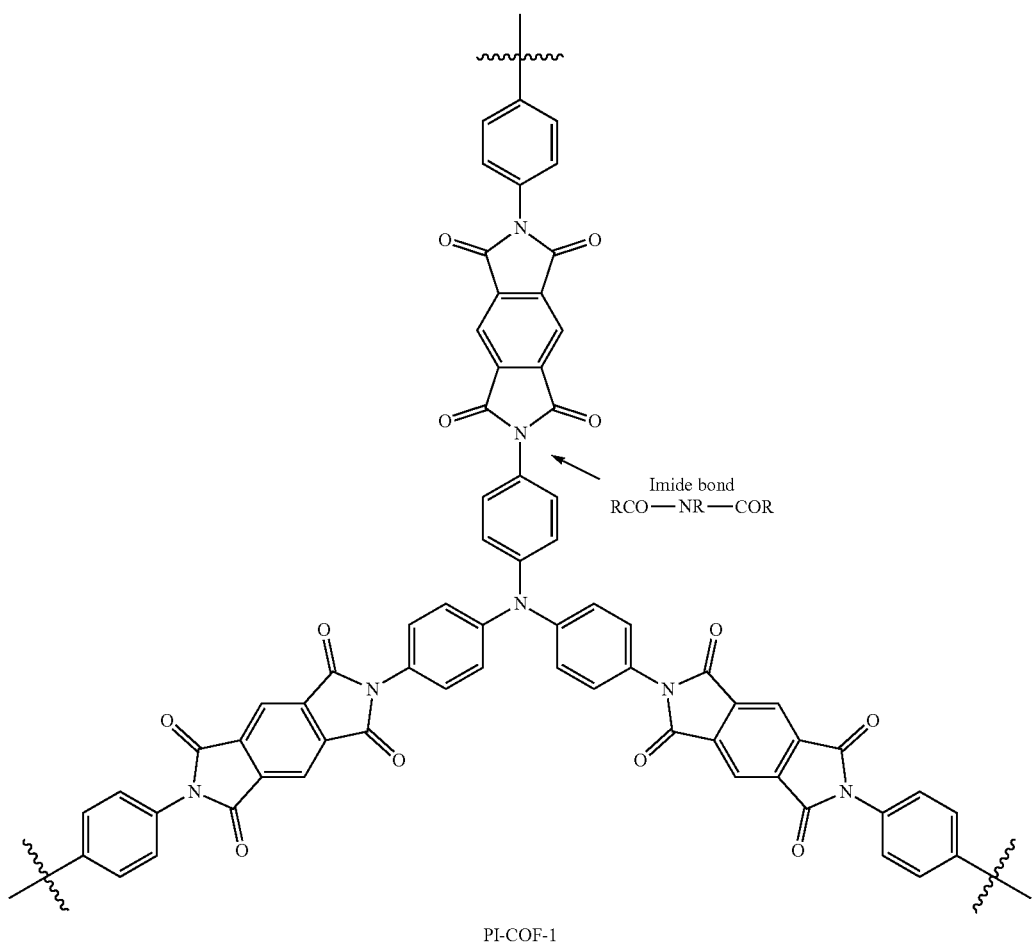
PI-COF-1

-continued
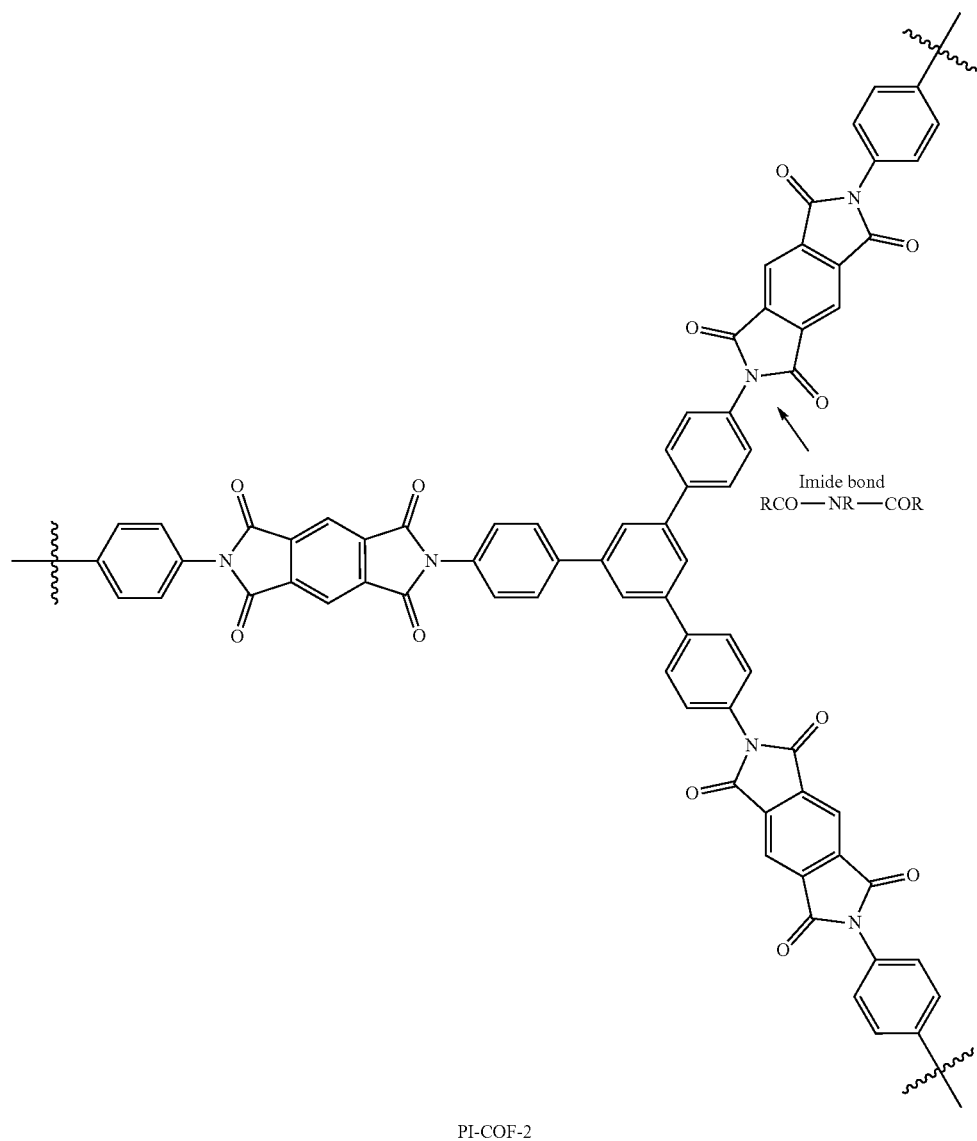
PI-COF-2

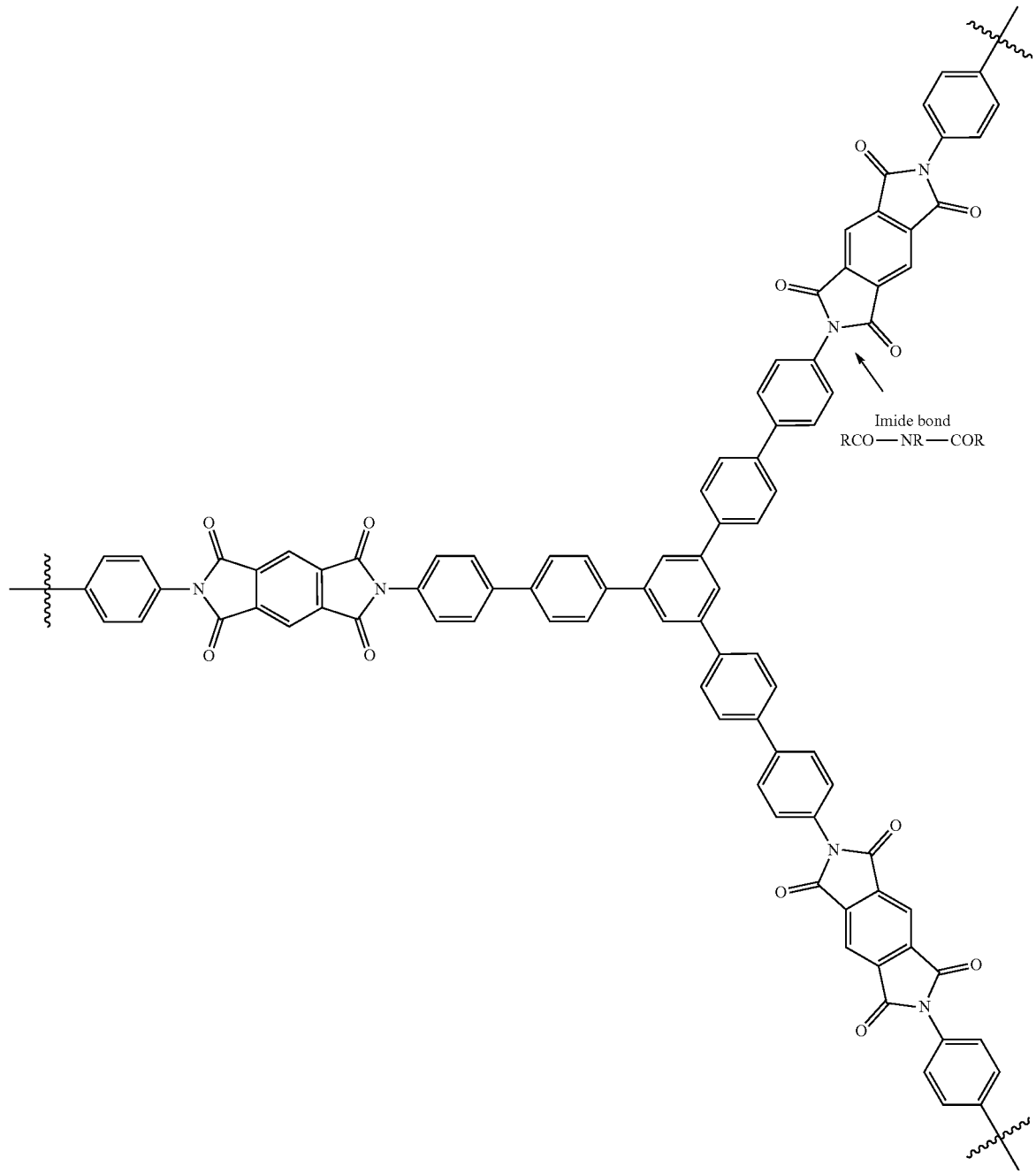
PI-COF-3

-continued
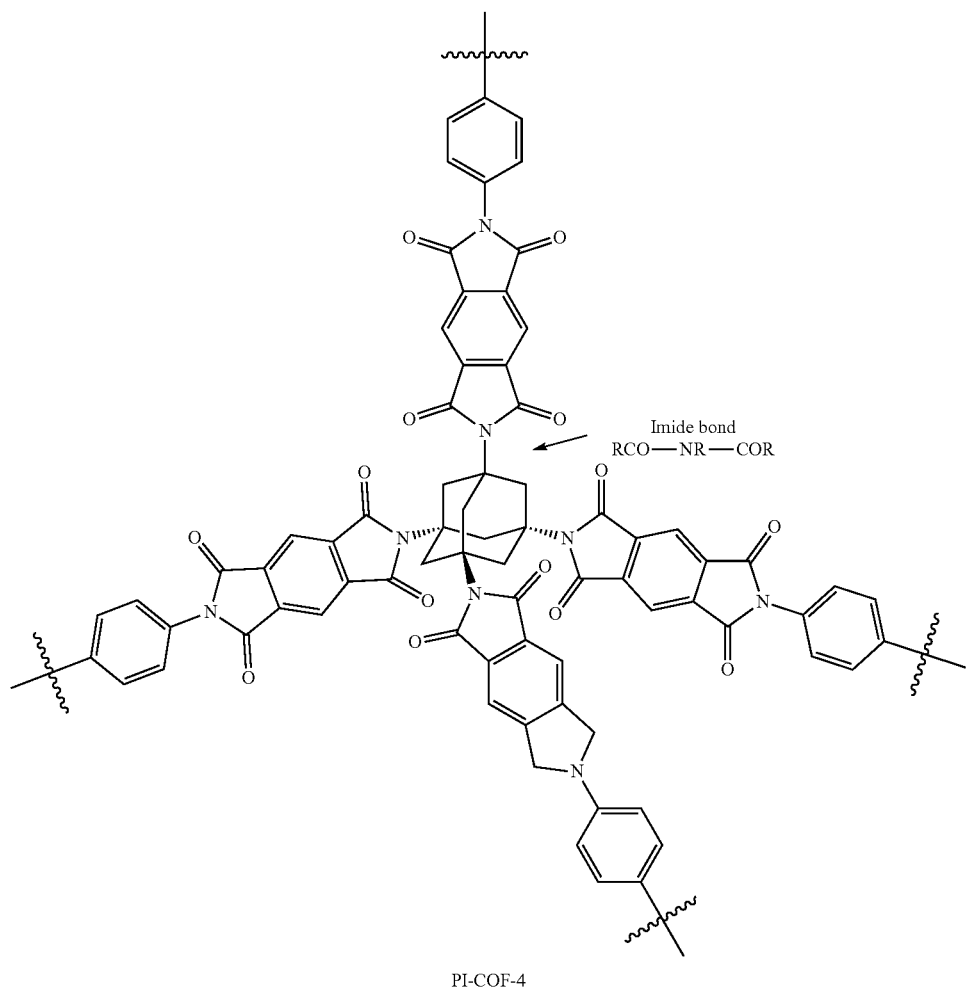
PI-COF-4

-continued

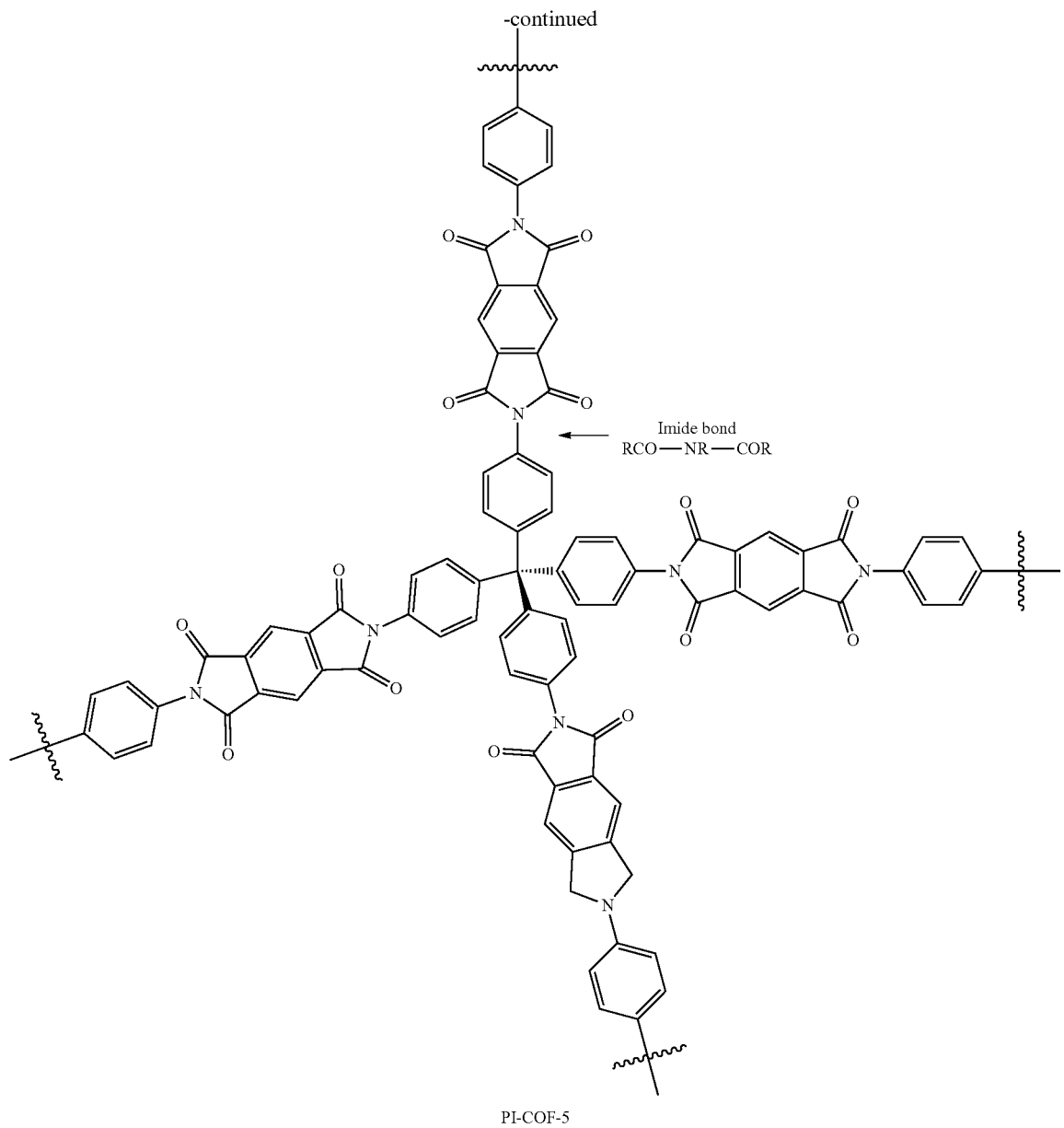

PI-COF-5

In the formulas, the arrows of COF-LZU1, COF-300 and TAPB-PDA-COF indicate the location of the imine bond ($R_2C=N-R$), the arrows of COF-TpPa-1 and DAAQ-TFP-COF indicate the enamine bond ($R_2C=CR-NR_2$), and the arrows of $N_3$-COF and ACOF-1 indicate the azine bond ($R_2C=N-N=CR_2$), the arrows of COF-42 and COF-43 indicate the hydrazone bond ($R_2C=N-NR_2$), and the arrows of PI-COF-1 to 5 indicate the imide bond (RCO—NR—COR). In the formulas, "R" is hydrogen, a hydrocarbon group or a hydrocarbon group containing a functional group, and when there are multiple Rs in a formula, Rs may be the same as or different from each other.

These COFs are easy to be synthesized, have excellent heat resistance and water resistance, and are also excellent in that they are less likely to be dissolved or decomposed even when coming into contact with the ionic liquid 8.

The porous member 7 is not limited to the above materials, and activated carbon, mesoporous silica, or the like can be used.

The porous member 7 may be, for example, a porous material formed as a continuous, integral film. When it is a crystalline material, it may be a continuous single crystal. When the porous member 7 thus formed is used, the risk of collapse of the sensitive film 3 due to a physical stimulus such as vibration is reduced. As a result, more stable detection is possible.

Alternatively, the porous member 7 may be formed into a film shape by gathering particulate or powdery porous material and/or fragments of the porous material or the like, or even if the porous member 7 does not have a film shape, there is no problem. The size of the particles, powder and fragments is, for example, preferably sufficiently larger than the diameter of the pores 7a of the porous member 7 and is, for example, preferably 10 times or more the diameter. The porous member 7 thus formed has a large specific surface area. Thus, more target molecules can be adsorbed, and detection sensitivity can be further improved.

The ionic liquid 8 is a salt having an anion and a cation and a melting point of 150° C. or lower. The type of the ionic liquid 8 is not limited, and examples of anions include hydroxide ion, halogen anion, trifluoromethanesulfonyl, bis(trifluoromethanesulfonyl)imide, bis(fluorosulfonyl)imide, tetrafluoroborate, hexafluorophosphate, acetate, dicyanamide, p-toluenesulfonate, tetrachloroferrate, tetrachloroaluminate, tetrafluoroaluminate, hexafluoroantimonate, methanesulfonate, trifluoro(trifluoromethyl)borate, thiocyanate, diethyl phosphate, ethyl sulfate, and the like. Examples of cations include organic ammonium, imidazolium, morpholium, phosphonium, piperidinium, pyridinium, pyrrolidinium, sulfonium, and the like.

As the ionic liquid 8, for example, 1-butyl-3-methylimidazolium hexafluorophosphate (BMIM-PF$_6$), 1-butyl-4-methylpyridinium hexafluorophosphate (BMPy-PF$_6$), 1-ethyl-3-methylpyridinium ethylsulphate (EMPy-ES), 1-ethyl-3-hydroxymethylpyridinium ethylsulphate (EHMPy-ES), or the like can be used.

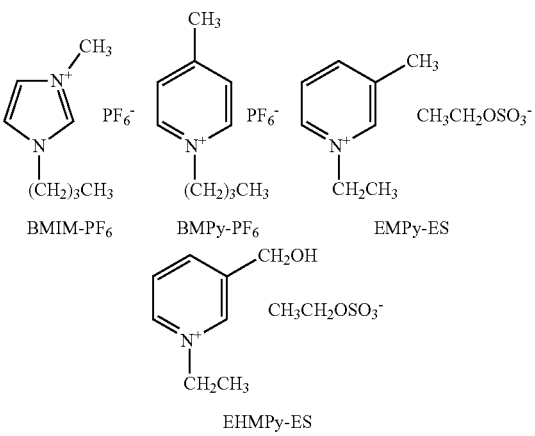

In the present specification, the coexistence of the ionic liquid 8 with the porous member 7 means a state in which the ionic liquid 8 and the porous member 7 are provided in the sensitive film, and the ionic liquid 8 and the porous member 7 are in at least partial contact with each other. The contact with each other includes, for example, a state in which the ionic liquid 8 is encapsulated inside the pore 7a of at least a portion of the porous member 7 and a case where the ionic liquid 8 exists on the surface of the porous member 7 or outside the porous member 7 such as the vicinity of the surface of the porous member 7. When the porous member 7 is used as a molecular sensor, the detection sensitivity of the target molecule is considered to change depending on the shape and size of the pore 7a. Thus, when the ionic liquid 8 exists inside the pore 7a, it is possible to adjust the size of a space inside the pore 7a and the magnitude of interaction, so that selectivity of the target molecule adsorbed to the sensitive film 3, specificity, and stability of detection can be improved. On the other hand, even when the ionic liquid 8 exists on the surface of the porous member 7 or in the vicinity thereof, a target substance is adsorbed in two steps into the porous member 7 via the ionic liquid 8, so that the selectivity of the target molecule, the specificity, and the stability of detection may be improved. When the surface shape of the porous member 7 has macro unevenness, a surface area of the ionic liquid 8 can be substantially increased. Thus, there is also an effect of increasing a contact probability between the ionic liquid 8 and the target molecule.

In order to specify the state in which the ionic liquid 8 and the porous member 7 coexist, for example, the sensitive film 3 is washed with a solvent such as methanol or ethanol that dissolves the ionic liquid 8 but does not dissolve the porous member 7. Then, only the ionic liquid is extracted and can be identified with IR (infrared spectroscopy), infrared spectroscopy such as FTIR (Fourier transform infrared spectroscopy), NMR (nuclear magnetic resonance), GC-MS (gas chromatograph/mass spectrometry), etc. On the other hand, in the porous member 7 after washing, the substance can be specified by comprehensively performing crystal structure analysis by XRD (X-ray diffraction method), observation of the surface and cross-sectional shape by SEM (scanning electron microscope) and TEM (transmission electron microscope), elemental analysis by EDX (energy dispersive X-ray analysis) and XPS (X-ray photoelectron spectroscopy), and other methods such as NMR (nuclear magnetic resonance), TGA (thermogravimetric analysis), and BET method (specific surface area measurement).

When the ionic liquid 8 enters into the pore 7a of the porous member 7, the pore 7a of the porous member 7 functions as a space having a unique property (such as size, shape and/or polarity). The characteristics of such a space can limit the type and amount of target molecule that can be adsorbed in the space. As a result, the type or amount of the adsorbed target molecule can be reflected in a physical quantity of the sensitive film 3, for example, a change amount of mass, electric resistance or electric conductivity. This can be one of the factors that the molecular sensor 1 exhibits selectivity.

Here, a method of specifying that the ionic liquid is held in the porous member will be described. When the ionic liquid 8 is held inside the porous member 7, if a spectrum is obtained by IR, infrared spectroscopy such as FTIR, Raman spectroscopy, or the like, due to the interaction between the ionic liquid 8 and the porous member 7, a shift may be seen in the spectrum of a specific wavelength (wave number). Further, a specific binding energy shift may be seen by XPS (X-ray photoelectron spectroscopy). Furthermore, reductions in pore volume and specific surface area may be seen by the BET method or the like as compared with the porous member 7 alone. In addition, when the ionic liquid 8 is encapsulated inside the porous member 7, an exothermic peak signal or an endothermic peak signal associated with crystallization or melting which is observed in the ionic liquid 8 alone by analysis by DSC (differential scanning calorimetry) may disappear or decrease due to a confinement effect. For example, it is possible to specify that the ionic liquid 8 is held in the porous member 7 by combining these analyses. Further, the distribution of existence of the ionic liquid 8 with respect to the porous member 7 can be analyzed using time-of-flight secondary ion mass spectrometry (TOF-SIMS) or the like.

The characteristics of the space can be easily changed by adjusting a combination of the type and/or amount ratio of the porous member 7 and the ionic liquid 8. Since the porous member 7 and the ionic liquid 8 are abundant in variety, the number of combinations is enormous, and the various sensitive films 3 can be produced. Therefore, the sensitive film 3 corresponding to various target molecules can be produced, and can be applied to various fields.

The ratio of the ionic liquid 8 to the porous material 7 is, for example, $5 \times 10^{-5}$ to 3 in weight ratio. If the weight ratio is less than $5 \times 10^{-5}$, the effect of the coexistence is low or the exhibition of the effect becomes unstable, whereas if the weight ratio is greater than 3, the characteristics of the ionic liquid 8 dominate mainly, making it difficult for the performance of the porous material 7 to exhibit. A further preferable ratio of the ionic liquid 8 to the porous material 7 is in a range of $5\times10^{-4}$ to 1.5 in weight ratio.

The sensitive film 3 can be formed by, for example, adding dropwise a dispersion, containing the material of the porous member 7 and the ionic liquid 8, onto a desired member (for example, the upper electrode 5). Alternatively, after the porous member 7 is formed into a film, the ionic liquid 8 may be added dropwise onto the porous member 7. A diluent such as methanol may be placed in the dispersion or the ionic liquid 8 and dried after film formation to remove the diluent. Further, when synthesizing the porous member 7 from the raw materials, the ionic liquid 8 may be mixed with the raw material beforehand, and then synthesized to be formed into a film.

After film formation, it is preferable to heat the sensitive film 3. For removal of moisture, the heating should preferably be carried out at 100° C. or higher, whereas for avoiding decomposition, it should be 200° C. or lower. The sensitive film 3 is preferably heated to, for example, about 120° C. for 2 hours and then cooled to room temperature. Further, in order to promote diffusion of the ionic liquid 8 into the pore 7a, the heating may be carried out under reduced pressure as needed.

For example, when a plurality of the sensitive films 3 are produced, after films of a plurality of the porous members 7 are formed in an array form, a different type of the ionic liquid 8 is added dropwise onto each of the porous members 7 by an inkjet printer or a micro dispenser, so that the sensitive films 3 can be easily produced. Furthermore, the same type of the ionic liquid 8 may be added dropwise while changing the amount of the ionic liquid 8 for each of the porous members 7.

The upper electrode 5 and the lower electrode 6 are preferably Pt, Au, Ag, Cu, Mo, Ni, Ti, W, Al, ITO, AZO, or the like, for example. A film in which a 200 nm Au layer is stacked on a 10 nm Ti layer is typically used. The upper electrode 5 and the lower electrode 6 do not have to have the shape shown in part (a) of FIG. 1 as long as the quartz substrate 4 can be excited.

The quartz substrate 4 is preferably AT-cut, for example. The quartz substrate 4 does not have to have a disk shape as shown in part (a) of FIG. 1, and may have a polygonal shape or the like.

The size of the QCM detection unit 2 is not limited and may be the same as that of a general QCM element. For example, the diameter of the quartz substrate 4 is preferably about 2 mm to 10 mm. With regard to the size of the sensitive film 3, for example, it is preferable that the sensitive film 3 be formed in a disk shape that is concentric with the upper excitation portion 5a and has a diameter smaller than the upper excitation portion 5a when viewed in plan. Although not limited, the diameter of the sensitive film 3 is preferably set to be, for example, 20% to 90% of the area of the quartz substrate 4. The thickness of the sensitive film 3 is preferably about 10 nm to 5 µm, for example.

The molecular sensor 1 may further include an AC power source (not shown) for applying a voltage between the upper electrode 5 and the lower electrode 6 by a lead wire or the like, and a frequency measuring device (not shown) that detects a frequency of the quartz substrate 4.

Molecular Detection Method

Next, a method of detecting a target molecule in a sample will be described. Here, the detection may be detection of the type and/or amount of the target molecule, for example.

The sample is, for example, a solid or liquid capable of generating the target molecule. The solid or liquid sample may be one that generates the target molecule at room temperature and atmospheric pressure. Alternatively, the sample may generate the target molecule, for example, when the atmosphere or a carrier gas such as $N_2$ or argon is flown, or when the sample is heated. The type of sample is not limited, and examples thereof include medicines, foods and drinks, drinking water, organisms, fragrances, cargo or luggage, household products, electric appliances, and the like. Alternatively, the sample may be a gas. The gas sample is, for example, air, exhaled air, exhaust gas, gas fuel, or the like.

The target molecule is, for example, a chemical substance in a gas state. For example, target molecules may be, but are not limited to, volatile organic compounds (VOC), oxygen, hydrogen, carbon dioxide, carbon monoxide, nitrogen, noble gases, hydrogen sulfide, ammonia, nitrogen oxides, acetylene, ethylene, methane, ethane, propane, and the like. The target molecule may be, for example, a chemical substance generated from or contained in a narcotic/stimulant, a gunpowder, an explosive, a chemical weapon, a fresh food, or a specific animal, plant or the like. Alternatively, 2-methylisoborneol, geosmin, or the like, which causes a musty odor, may be used.

As described above, the target molecule is not necessarily one type of molecule, and may include a plurality of types of molecules. The plurality of types of molecules may be, for example, a group of molecules that form an odor.

Figure 2:
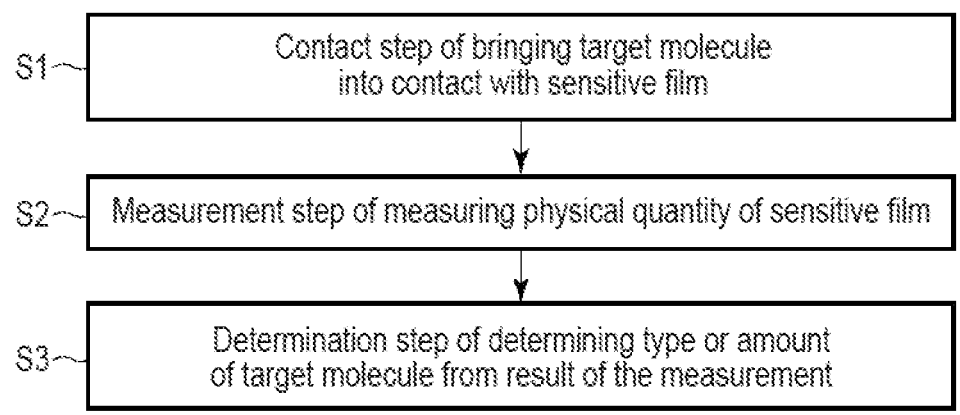
FIG. 2 is a flowchart showing an example of a molecular detection method of the first embodiment.

As shown in FIG. 2, the detection method according to the embodiment includes, for example, the following steps: (S1) a contact step of bringing the target molecule into contact with the sensitive film 3, (S2) a measurement step of measuring a change in the physical quantity of the sensitive film 3 due to the adsorption of the target molecule to the sensitive film 3, and (S3) a determination step of determining the type or amount of the target molecule from the result of the measurement.

Hereinafter, an example of a procedure of the detection method will be described.

First, the molecular sensor 1 is prepared. Next, the target molecule is brought into contact with the sensitive film 3 by, for example, placing the molecular sensor 1 in an environment where the sample exists, bringing the sample close to the molecular sensor 1, or blowing or suctioning the sample to bring the target molecule into contact with the sensitive film 3 (contact step S1).

The contact step S1 allows the target molecule to be adsorbed to the sensitive film 3. When the target molecule is a molecule easily adsorbed to the sensitive film 3, the target molecule can enter from the surface of the sensitive film 3 and permeate into the pore 7a provided on the depth side.

Next, the physical quantity of the sensitive film 3 is measured using the QCM detection unit 2 (measurement step S2). For example, the measurement may be performed over time from before the contact step S1, and measurement data when a change amount of a measurement value is maximum or when the change amount of the measurement value becomes a constant value (saturation value) may be used. A rate of change of the measurement value over a certain period of time may be used. Alternatively, the measurement does not have to be performed over time, and in that case, the measurement may be performed at at least two time points before and after the contact step S1.

According to a further embodiment, the measurement may not be performed before the contact step S1. In that case, as the measurement value before the contact step S1, a physical quantity measurement value obtained when the target molecule is not adsorbed to the sensitive film 3 obtained in the past may be used. Alternatively, as the measurement value before the contact step S1, a measurement value of a gas that does not contain the target molecule in a detectable amount, for example, the atmosphere may be used.

In the QCM detection unit 2, the mass of the sensitive film 3 can be measured by converting a oscillation frequency of the quartz substrate 4 into an electrical signal and detecting the electrical signal. After the contact step S1, the oscillation frequency of the quartz substrate 4 changes due to energy loss corresponding to the mass of the target molecule adsorbed to the sensitive film 3, and an electrical signal measurement value that changes accordingly is obtained.

Next, the type or amount of the target molecule is determined using the measurement result obtained in the measurement step S2 (determination step S3). First, the change amount of the measurement value before and after the contact step S1 is calculated. For example, the change amount is calculated by subtracting the measurement value before the contact step S1 from the measurement value after the contact step S1. The change amount may be used in the next step in the form of the change amount of the electrical signal, or may used by being converted into a change amount of the physical quantity. Next, the type or amount of the target molecule is determined from the change amount.

For example, before carrying out the present detection method, for a plurality of types of the sensitive films 3, by measuring the change in the physical quantity in advance for each of a plurality of types of known standard target molecules, the type of the target molecule that can be detected for each type of the sensitive films 3 can be associated.

Therefore, when there is a change in the physical quantity in the sample using the specific sensitive film 3, by comparing with the above association, the target molecule contained in the sample can be determined to be one of the standard target molecules that can be detected by the sensitive film 3. If no change in physical quantity is observed in the sample, the detection is repeated again using another sensitive film 3 to find the sensitive film 3 in which the physical quantity has changed, whereby the types of target molecules can be narrowed down. This process can be performed at once by using a multi molecular sensor including a plurality of molecular sensors described later.

The molecular sensor 1 can also determine the amount and concentration of the target molecule. For example, using the sensitive film 3 associated with a specific standard target molecule, a calibration curve of the change amount of the physical quantity of the sensitive film 3 is created with a plurality of concentrations of the standard target molecule. By comparing the change amount in the sample with this calibration curve, the concentration of the target molecule can be determined.

In a further embodiment, the molecular detection method may further include a heating removal step of removing the target molecule adsorbed to the sensitive film 3 by heating the sensitive film 3 after the measurement step S2. For example, heating is preferably performed at 80° C. to 200° C. for about 10 seconds to 600 seconds. By performing heating under this condition, the target molecule that has entered the inside of the sensitive film 3 can be easily released. Since the porous member 7 and the ionic liquid 8 have an excellent heat resistance of, for example, 200° C. or higher, almost all the target molecules can be removed without denaturing the structure of the sensitive film 3 even under such heating conditions. As a result, the sensitivity is prevented from being lowered by the remaining target molecules, and it becomes possible to perform detection with high sensitivity again. For this reason, the molecular sensor 1 of the embodiment can be reused by a simple operation of heating and is economical.

The molecular sensor 1 may include a temperature adjustment device that heats the sensitive film 3.

According to the molecular sensor 1 of the embodiment, by changing the type and amount ratio of the porous member 7 and the ionic liquid 8 as described above, the size, shape, polarity, etc., of a space where the target molecule is adsorbed can be easily adjusted. Therefore, it is possible to provide the various sensitive films 3 for selective and specific detection from various target molecules.

The porous member 7 has the large number of pores 7a and has a large specific surface area. For example, the specific surface area is about several tens $m^2/g$ to several thousands $m^2/g$. By using the porous member 7 thus configured, a large number of spaces where the target molecule as described above can enter are formed, and more target molecules can be adsorbed. Therefore, it is possible to perform detection with higher sensitivity.

In addition, in the molecular structure of the pore 7a of the porous member 7, chemical bonds continue two-dimensionally or three-dimensionally, so that the molecular structure is hardly deformed, and is maintained substantially uniform over the entire porous member 7. Therefore, there is little variation in the size, shape, and/or polarity of the space where the target molecule enters as described above, and stable detection can be performed.

Multi Molecular Sensor

According to a further embodiment, there is provided a multi molecular sensor including a plurality of molecular sensors of different types. Here, "different types" means that combinations of the types and/or amount ratios of the porous member 7 and the ionic liquid 8 used in the sensitive film 3 are different from each other. The term "different from each other" does not necessarily mean that all molecular sensors are different, and encompasses a case where molecular sensors are partially the same.

Figure 3:
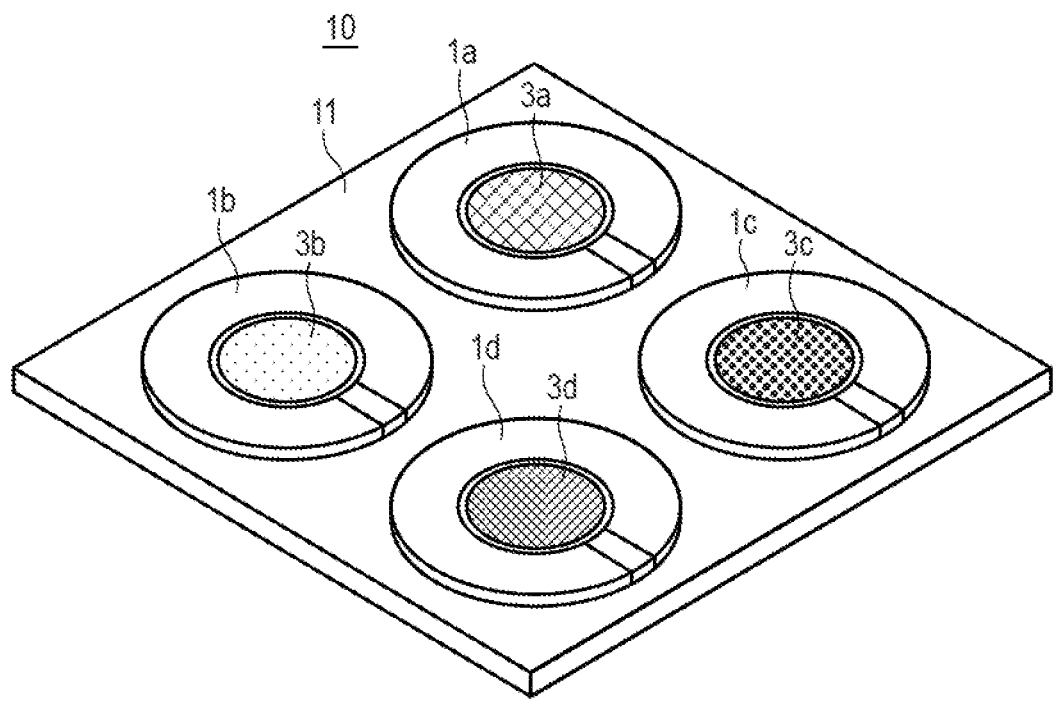
FIG. 3 is a diagram showing an example of a multi molecular sensor of the first embodiment.

FIG. 3 shows a multi molecular sensor 10. The multi molecular sensor 10 includes four types of molecular sensors 1a to 1d arranged in an array on a substrate 11. The molecular sensors 1a to 1d have the same configuration as that of the molecular sensor 1 described above, and include sensitive films 3a to 3d of different types, respectively. Other configurations may be the same as each other.

In the multi molecular sensor 10, changes in the physical quantities of the sensitive films 3a to 3d can be individually measured. For example, each of the molecular sensors 1a to 1d may individually include a frequency measuring device (not shown), or for the molecular sensors 1a to 1d, a frequency measuring device may perform measurement sequentially one by one.

In the detection method using the multi molecular sensor 10, for example, one type of sample is brought into contact with the molecular sensors 1a to 1d at once to perform measurement. As a result, four change amounts (data a to d) corresponding to the molecular sensors 1a to 1d are obtained. When the plurality of the data a to d are combined and recognized as a pattern, the pattern may differ depending on the type of target molecule. For example, change amount patterns are recorded in advance for a plurality of types of standard target molecules, the pattern in the sample is compared with the change amount patterns, and if there are standard target molecules with similar patterns, it can be determined that the same type of target molecule exists in the sample.

Figure 4:
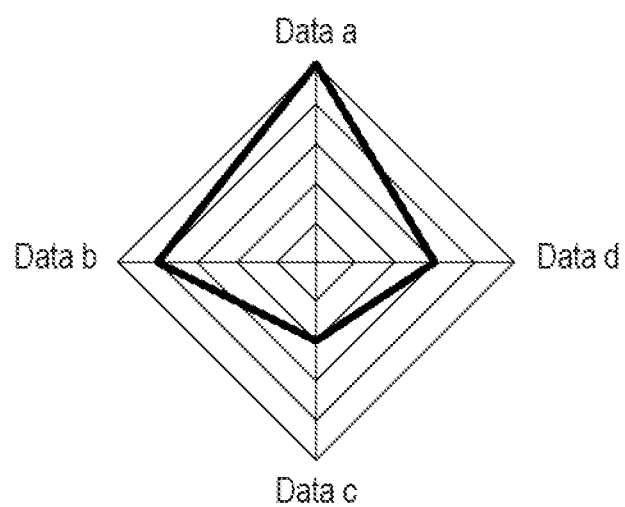
FIG. 4 is a diagram showing an example of a radar chart obtained by the multi molecular sensor of the first embodiment.

The pattern may be, for example, a ratio of the four change amounts. Alternatively, for example, by representing the data a to d on a radar chart as shown in FIG. 4, the pattern is obtained as a polygon having a specific shape. Since this shape may differ depending on the type of the target molecule, the type of the target molecule can be easily specified by performing comparison as described above based on the shape.

The amount of the target molecule can be determined by the size of the entire pattern. For example, when the polygonal shape of the radar chart is similar to a standard target molecule and the size of the polygon is larger than the standard target molecule, it can be seen that although the target molecule contained in the sample is of the same type as the standard target molecule, the amount is larger than the amount of the standard target molecule.

The number of molecular sensors included in the multi molecular sensor is not limited to four, and two, three, or four or more molecular sensors may be arranged. Preferably, three or more molecular sensors are arranged. The larger the number of molecular sensors, the more accurately a target molecule having a similar chemical structure can be detected. The olfactory sense of an organism can be reproduced by arranging the same number as the types of olfactory receptors of the organism. A plurality of the molecular sensors are not necessarily arranged in an array, and may be arranged, for example, in a straight line, in a circle, or at random positions.

According to a further embodiment, the type of sample containing a plurality of types of target molecules can be identified or distinguished by application of pattern recognition as described above and analysis using machine learning or the like. For example, for a single odor containing a plurality of chemical substances, such as a rose scent and a wine scent, each pattern can be obtained by the multi molecular sensor. By comparing with patterns of a plurality of known standard samples, the type and amount can be detected from the pattern obtained from the sample. Even in the same wine scent, for example, it is also possible to identify or distinguish complexes that have slight differences in composition such as different brands.

The sensitive film of the multi molecular sensor can be easily produced by forming films of the porous members 7 in an array form and then adding dropwise the different ionic liquid 8 onto each of the porous members 7 by an inkjet printer or a micro dispenser. Furthermore, the same type of the ionic liquid 8 may be added dropwise while changing the amount of the ionic liquid 8.

Second Embodiment

According to a second embodiment, there is provided a molecular sensor having a measurement mechanism that uses a micro cantilever (MCL) as a detection unit.

Figure 5:
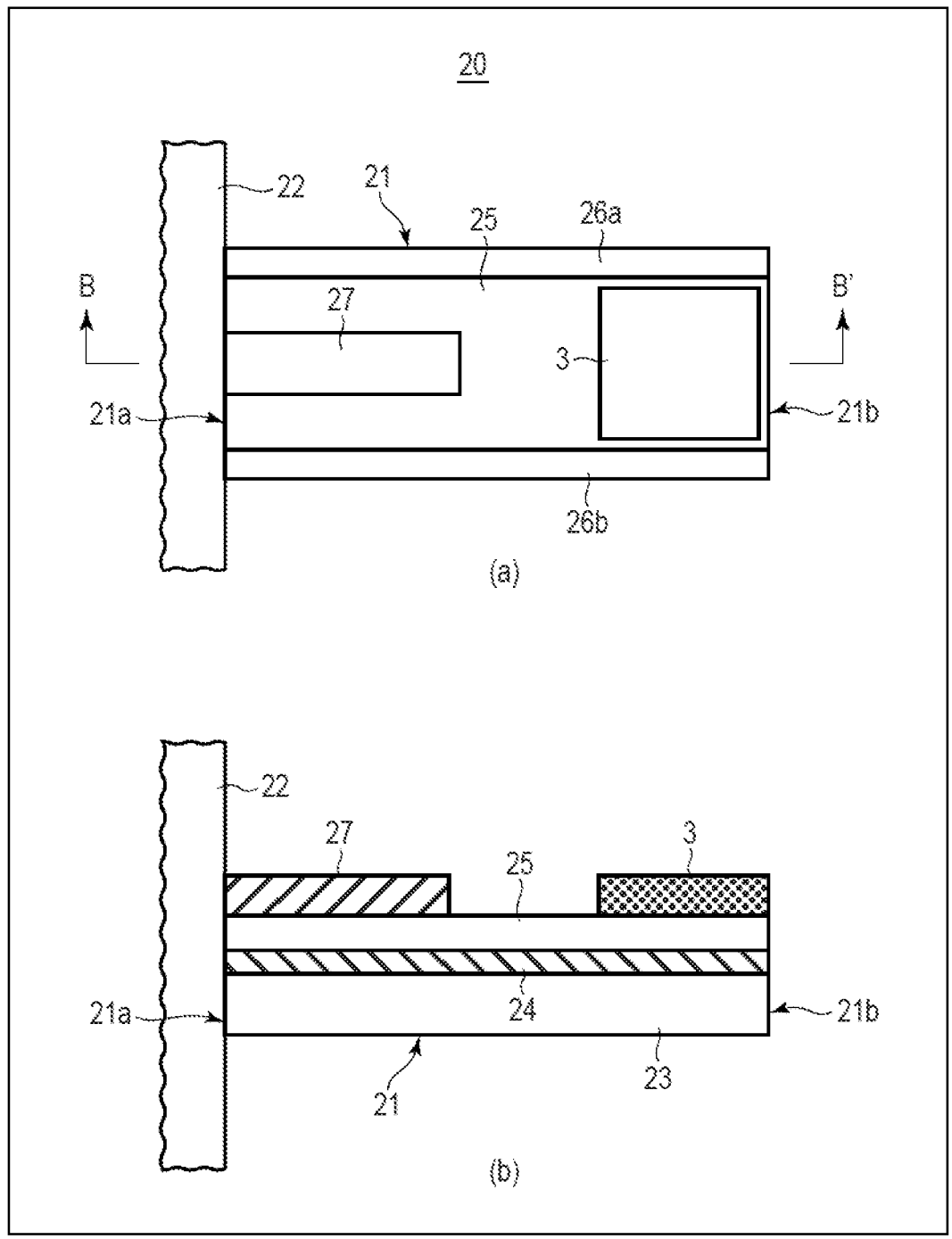
FIG. 5 is diagram showing an example of a molecular sensor of a second embodiment.

Part (a) and (b) of FIG. 5 shows a molecular sensor 20 including an MCL detection unit 21. Part (a) of FIG. 5 is a plan view of the molecular sensor 20, and part (b) of FIG. 5 is a cross-sectional view taken along the line B-B' of the molecular sensor 20.

The molecular sensor 20 in this example includes an MCL detection unit 21 and a sensitive film 3 provided on a surface of the MCL detection unit 21.

The MCL detection unit 21 has an elongated rectangular shape in a plan view, and has a fixed end 21a fixed to a support 22 and a free end 21b that is not fixed. That is, the MCL detection unit 21 has a cantilever shape. The MCL detection unit 21 has a layered structure and includes a substrate 23 as the lowermost layer. A lower electrode 24 is stacked on the substrate 23. A piezoelectric body 25 is stacked on the lower electrode 24. Elongated first upper electrode 26a and second upper electrode 26b are stacked along two long sides of the piezoelectric body 25. A detection electrode 27 is stacked on the piezoelectric body 25 located on the fixed end 21a side between the first upper electrode 26a and the second upper electrode 26b.

The sensitive film 3 is preferably fixed to a portion of an uppermost surface of the MCL detection unit 21 near the free end 21b. For example, the sensitive film 3 is fixed onto the piezoelectric body 25 between the first upper electrode 26a and the second upper electrode 26b. A conductive film such as an Au thin film, an insulating film such as $SiO_2$, a metal oxide film such as of $Al_2O_3$ or $TiO_2$, a silane coupling agent, a self-assembled monolayer film, or the like (not shown) may be interposed between the piezoelectric body 25 and the sensitive film 3.

The first upper electrode 26a, the second upper electrode 26b, and the lower electrode 24 are connected to an AC power source or the like, and apply an AC voltage to the piezoelectric body 25. Since the piezoelectric body 25 is deformed by voltage application, the piezoelectric body 25 expands and contracts due to the AC voltage and vibrates at a predetermined resonance frequency. The detection electrode 27 detects the frequency of the piezoelectric body 25.

The substrate 23 is formed using, for example, silicon, glass, resin, or the like.

The upper electrode 26, the lower electrode 24, and the detection electrode 27 are formed using a metal material such as Pt, Au, Mo, W, and Al.

The piezoelectric body 25 is formed by using, for example, lead zirconate titanate (PZT), lead zinc niobate-lead titanate solid solution (PZN-PT), lead manganate niobate-lead titanate zirconate solid solution (PMnN-PZT), aluminum nitride (AlN), zinc oxide (ZnO), potassium sodium niobate (KNN), lithium niobate (LiNbO$_3$), and the like.

The size of the MCL detection unit 21 is not limited and may be the same as that of a general MCL element. For example, the dimension of the sensitive film 3 in a plan view can be set to be 20% to 90% of the area of the MCL 21. The thickness of the cross section is preferably about 10 nm to 5 μm.

The molecular sensor 20 as described above can also be used in the same detection method as in the first embodiment. In the molecular sensor 20, when the target molecule is adsorbed to the sensitive film 3, the energy loss corresponding to the mass of the target molecule occurs, so that the resonance frequency of the piezoelectric body 25 changes. The target molecule can be detected by measuring the change with the detection electrode 27.

The molecular sensor 20 may be a multi molecular sensor. For example, a plurality of types of the molecular sensors 20 in which the configurations of the sensitive films 3 are different from each other can be fixed to the support 22. The plurality of types of the molecular sensors 20 in which the configurations of the sensitive films 3 are different from each other may be fixed to different supports.

Although the example of using the QCM detection unit 2 and the MCL detection unit 21 has been described above, the detection unit is not limited to these, and another measurement mechanism may be used. The detection unit is preferably a mechanism capable of measuring a mass change of the sensitive film 3, for example.

According to a further embodiment, there is provided a detection unit using surface acoustic waves (SAW) or the like. A SAW detection unit includes, for example, two sets of interdigitated electrodes (IDEs) arranged on a piezoelectric substrate surface at desired intervals. The sensitive film 3 can be disposed, for example, between two sets of electrodes on the piezoelectric substrate. When the target molecule is adsorbed to the sensitive film 3, the propagation velocity and amplitude of a surface acoustic wave propagating on the piezoelectric substrate surface change, and the target molecule can be detected by detecting the change with the two electrodes.

Alternatively, a detection unit including a mechanism capable of measuring changes in the electric resistance, impedance, electric conductivity, etc., of the sensitive film 3 may be used. Such a detection unit uses, for example, a field effect transistor (FET), an IDE type sensor (interdigitated electrode: IDE), or the like.

For example, when the FET is used, the sensitive film 3 can be disposed as a channel that connects between a source electrode and a drain electrode, for example. When the IDE type sensor is used, the sensitive film 3 can be provided between or on the electrodes of the IDE, for example.

Third Embodiment

Molecular Detection Device

Figure 6:
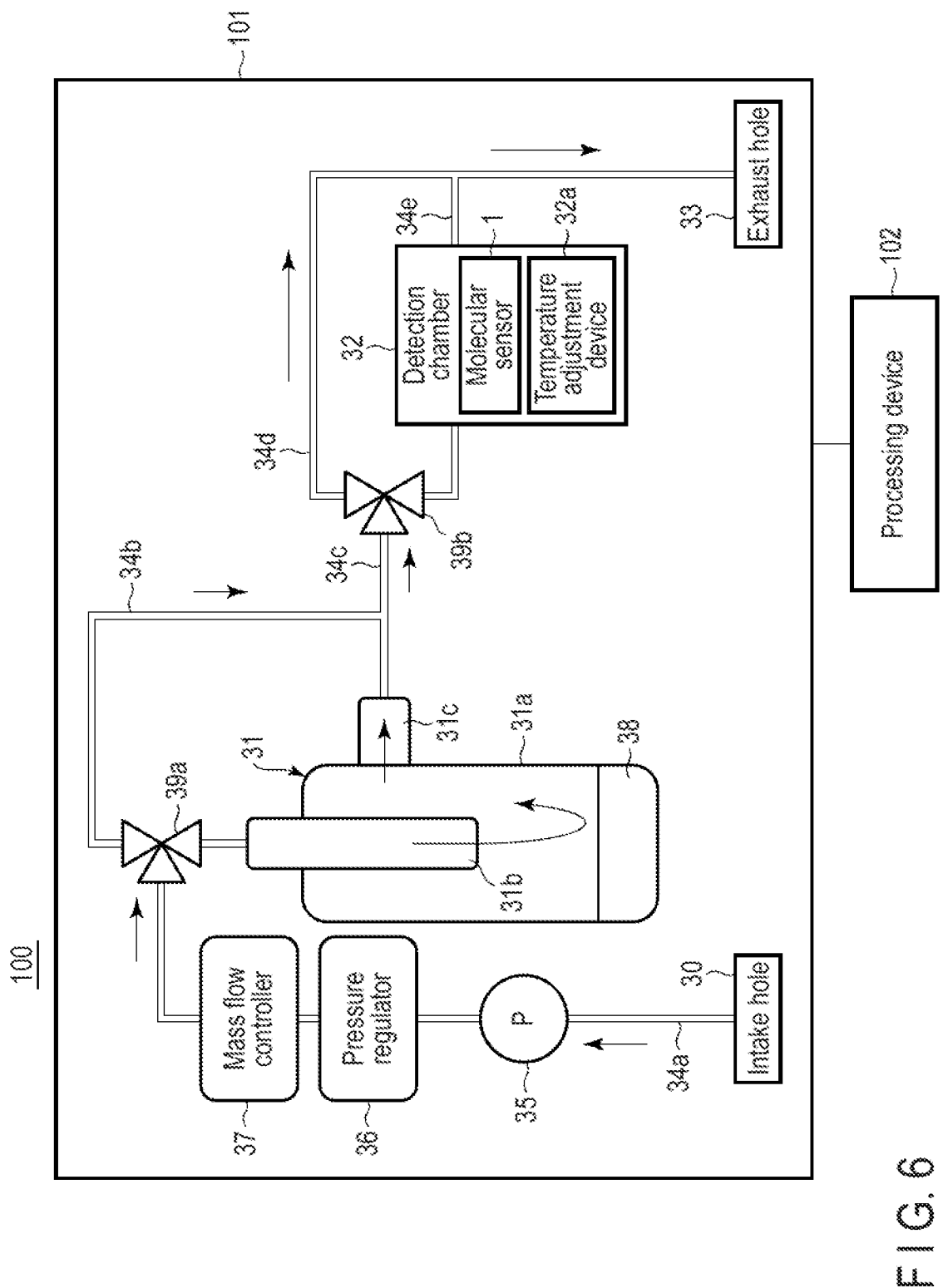
FIG. 6 is a block diagram showing an example of a molecular detection device of a third embodiment.

According to the third embodiment, there is provided a molecular detection device including any one of the molecular sensors described above. As shown in FIG. 6, a molecular detection device 100 includes a detection unit 101, including a molecular sensor 1, and a processing device 102.

The detection unit 101 includes an intake hole 30, a gas generator 31, a detection chamber 32, and an exhaust hole 33. These members are connected by, for example, a flow path. The arrows in the figure represent a direction of gas flow.

A filter (not shown) may be provided between the intake hole 30 and a pump 35. The intake hole 30 and the gas generator 31 are connected by, for example, a flow path 34a. For example, a pump 35, a pressure regulator 36, and a mass flow controller 37 are interposed in the flow path 34a in this order from the intake hole 30 side toward the gas generator 31.

The gas generator 31 includes, for example, a container 31a for containing a sample 38, a gas introduction pipe 31b for introducing the atmosphere sucked from the intake hole 30 into the container 31a, a gas lead-through pipe 31c for allowing gas to flow out of the container 31a, and a sample feed inlet (not shown). The gas introduction pipe 31b is disposed so as to face the sample 38 contained in a bottom of the container 31a, for example. The gas lead-through pipe 31c is connected to the detection chamber 32 by a flow path 34c in which a three-way valve 39b is interposed.

A three-way valve 39a is interposed between the mass flow controller 37 and the gas introduction pipe 31b of the gas generator 31. One valve of the three-way valve 39a is connected to the gas introduction pipe 31b, and the other valve is connected via a flow path 34b to the flow path 34c connecting the gas lead-through pipe 31c and the three-way valve 39b. Immediately before the flow path 34b is connected to the flow path 34c, a valve for preventing backflow to the gas generator 31 may be separately provided.

A flow path 34d is connected to the third valve of the three-way valve 39b. The other end of the flow path 34d is directly connected to the exhaust hole 33. The three-way valve 39b is switched to send gas to the detection chamber 32 when measurement is performed, is switched to send the gas to the flow path 34d when measurement is not performed, and discharges the gas from the exhaust hole 33.

The detection chamber 32 contains the molecular sensor 1. The molecular sensor 1 analyzes the target molecule contained in the gas sent from the gas generator 31. The detection chamber 32 may include a temperature adjustment device 32a for heating and cooling the sensitive film 3 of the molecular sensor 1. The detection chamber 32 may further include a power source (not shown) that applies a voltage to the detection unit of the molecular sensor 1.

The detection chamber 32 is connected to the exhaust hole 33 by a flow path 34e, so that the analyzed gas is discharged through the flow path 34e.

For example, the detection unit 101 may further include the pump 35, the pressure regulator 36, the mass flow controller 37, the three-way valve 39a, the three-way valve 39b, the temperature adjustment device 32a, and a driver 46 (see FIG. 7) that drives a power supply according to a command of a CPU 40 described later.

The detection chamber 32 may be formed, for example, in the shape of a cassette and attached to the detection unit 101 so as to be able to be taken in and out. In that case, the molecular sensor 1 can be replaced according to the type of the target molecule to be detected. Alternatively, even if the detection chamber 32 is fixed to the detection unit 101, there is no problem. The molecular sensor 1 disposed in the detection chamber 32 may be the molecular sensor of any of the above embodiments. A plurality of molecular sensors may be set, or a multi molecular sensor may be used.

As shown in FIG. 7, the processing device 102 includes, for example, the CPU 40, a storage section 41, an input device 42, and a display device 43. The processing device 102 may further include an interface (I/F) 44 that outputs a measurement value as an electrical signal from the molecular sensor 1 to the storage section 41, and an I/F 45 that outputs a drive signal to the driver 46.

The CPU 40 controls each part of the detection unit 101 and the processing device 102 and calculates measurement values according to a program.

The storage section 41 stores a program executed by the CPU 40, information on a measurement value output from the molecular sensor 1, and an arithmetic expression and a calibration curve used for calculating the measurement value, and/or a measurement value or a pattern of a standard target molecule. The storage section 41 includes a non-volatile memory such as a flash memory, and a volatile memory such as a RAM.

The input device 42 includes a keyboard, a mouse, switches, buttons, etc., for inputting various information to the processing device 102.

The display device 43 includes a display or the like that displays a calculation result or the like as a chart or text. Instead of providing the input device 42 and the display device 43 separately, a touch panel having a display function and an input function may be provided.

Each part in the processing device 102 is connected by, for example, a system bus 47.

The molecular detection device 100 may not include the gas generator 31. In that case, measurement can be performed by bringing the intake hole 30 close to the sample 38, further blowing and suctioning, and placing the molecular detection device 100 in a space where the sample 38 exists.

The molecular sensor 1 can be manufactured as a chip of the order of about 1 mm. The molecular detection device 100 can be a portable device of the order of about several tens of cm.

Figure 8:
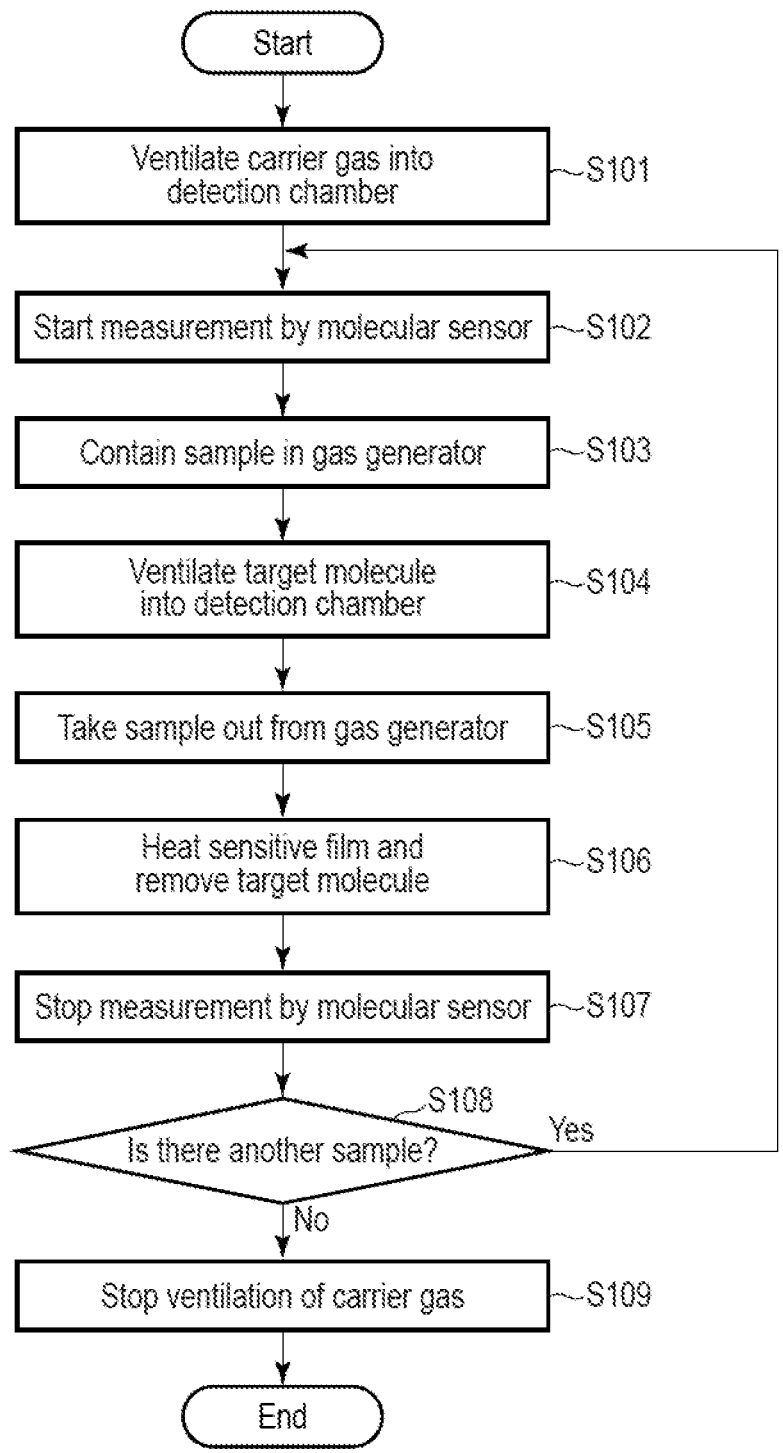
FIG. 8 is a flowchart showing an example of a molecular detection method of the third embodiment.

A method of operating the molecular detection device 100 will be described with reference to FIG. 8.

First, a carrier gas is ventilated into the detection chamber 32 (S101). The carrier gas is, for example, an atmosphere, but may be another gas. As the carrier gas, for example, $N_2$ or argon gas connected to a cylinder or the like may be used. When a cylinder is used, the cylinder is connected directly to the pressure regulator 36 without using a pump.

For example, according to a command from the CPU 40, the three-way valve 39a is switched to the gas generator 31 side, and the three-way valve 39b is switched to the detection chamber 32 side. The pump 35 is driven through the driver 46. By driving the pump 35, the carrier gas is sent from the intake hole 30 to the detection chamber 32 through the flow path 34a, the gas generator 31, and the flow path 34c. The mass flow controller 37 controls a flow rate of the carrier gas. By this operation, the gas previously contained in the detection chamber 32 is discharged from the exhaust hole 33 to the outside.

Next, the molecular sensor 1 starts measurement (S102). In the measurement, if the molecular sensor 1 is a sensor using QCM, a voltage is applied between the upper electrode 5 and the lower electrode 6, and the oscillation frequency of the quartz substrate 4 is measured by a frequency measuring device. The obtained electrical signal (measurement value of carrier gas) is sent to the storage section 41 at a constant sampling rate and stored in the storage section 41.

Next, the sample 38 is contained in the container 31a through the sample feed inlet (not shown) of the container 31a of the gas generator 31 (S103). The carrier gas is released from the gas introduction pipe 31b of the gas generator 31 toward the sample 38 in the container 31a, and is discharged from the gas lead-through pipe 31c to the flow path 34c. At that time, a target molecule generated from the sample 38 is also mixed and then discharged together with the carrier gas from the gas lead-through pipe 31c. The carrier gas containing the target molecule, which has flowed into the flow path 34c, is ventilated into the detection chamber 32 (S104).

In the molecular sensor 1, the oscillation frequency of the quartz substrate 4 changes due to the adsorption of the target molecule on the sensitive film 3. Then, the carrier gas containing the target molecule is discharged from the exhaust hole 33 through the flow path 34e. If the sample 38 does not make it into the container 31a, the three-way valve 39a may be switched to allow the carrier gas to flow into the flow path 34b, and then the intake hole 30 may be brought close to the sample 38 for suction.

Next, the sample 38 is taken out from the gas generator 31 (S105). As a result, the carrier gas containing no target molecule is ventilated into the detection chamber 32. If the target molecule remains in the container 31a, the three-way valve 39a may be switched to the flow path 34b side to promptly ventilate the carrier gas into the detection chamber 32.

Next, the sensitive film 3 is heated by driving the temperature adjustment device 32a according to the command of the CPU 40 (S106). As a result, the target molecule is removed from the sensitive film 3. Subsequently, the sensitive film 3 is cooled to the original temperature by the temperature adjustment device 32a. The target molecule can also be removed from the sensitive film 3 only by ventilation of the carrier gas without performing the heating in step S106. Then, the carrier gas containing the target molecule is discharged from the exhaust hole 33 through the flow path 34e. Then, the measurement by the molecular sensor is stopped (S107).

After that, when there is another sample to be measured (S108, Yes), the process may return to step S102 to perform the measurement again. When there is no sample to be measured anymore and the measurement ends (S108, No), the drive of the pump 35 is stopped, and the ventilation of the carrier gas is stopped (S109).

On the other hand, after the measurement is completed in step S107, the CPU 40 retrieves the stored measurement value and arithmetic expression from the storage section 41 and calculates a change amount of the measurement value. For example, the data to be analyzed may be, as shown in FIG. 9, a oscillation frequency change amount that can be obtained by subtracting the measurement value (baseline) of the carrier gas obtained in step S102 from a maximum value or saturation value of the measurement value obtained in step S104. This means a total adsorption amount of the target molecule on the molecular sensor 1. Alternatively, the data to be analyzed may be a rising slope of the oscillation frequency obtained in step S104. This means an adsorption rate of the target molecule to the molecular sensor 1. Alternatively, the data to be analyzed may be a falling slope of the oscillation frequency in step S106. This means a desorption rate of the target molecule from the molecular sensor 1. Alternatively, the data to be analyzed may be the oscillation frequency change amount that can be obtained by subtracting the measurement value (baseline) obtained at the end of step S106 from the maximum value or the saturation value obtained in step S104. This means a total desorption amount of the target molecule from the molecular sensor 1. These change amounts are output from the CPU 40 to the storage section 41 and stored in the storage section 41. When the detection chamber 32 includes a plurality of molecular sensors, the CPU 40 further calculates a pattern of a change amount for each of the molecular sensors, and outputs the pattern to the storage section 41 for storage.

Subsequently, the CPU 40 retrieves the change amount and the arithmetic expression, if necessary, the calibration curve, the measurement value or the pattern of the standard target molecule, etc., from the storage section 41, and determines the type and/or amount of the target molecule. The determination result is output from the CPU 40 to the storage section 41 and stored in the storage section 41. The determination result may be output to the display device 43.

When a plurality of samples are measured, the respective results are sequentially output for the samples.

The data processing, calculation and analysis as described above do not necessarily have to be performed by using the CPU 40 and the storage section 41 in the molecular detection device 100, and may be performed by externally attached hardware. Alternatively, data processing, calculation and analysis may be performed using cloud computing via a network. In that case, the molecular detection device 100 may include a data transmission section and a data reception section (not shown).

According to the molecular detection device described above, it is possible to detect a target molecule with improved sensitivity and selectivity. The molecular detection device can be easily reused and can be used repeatedly, which is advantageous for on-site work.

EXAMPLE

Hereinafter, an example in which a QCM molecular sensor including a sensitive film shown in Table 1 is manufactured and the target molecule is detected using the sensor will be described.

TABLE 1

|  | Configuration of sensitive film | |
|---|---|---|
|  | Porous material | Ionic liquid |
| Example 1 | MOF (UIO-67) | BMIM-PF$_6$ |
| Comparative Example 1 | MOF (UIO-67) | — |
| Comparative Example 2 | — | BMIM-PF$_6$ |
| Example 2 | COF (COF_LUZ1) | BMIM-PF$_6$ |
| Comparative Example 3 | COF (COF_LUZ1) | — |
| Comparative Example 4 | — | BMIM-PE$_6$ |

* "—" represents nothing (Manufacture 1 of MOF/Ionic Liquid Molecular Sensor)

Synthesis and Activation of UIO-67 Particles

UIO-67 was synthesized with reference to Honghan Fei et al., "Robust, Catalytic Metal-Organic Framework with Open 2,2'-Bipyridine Sites", ChemComm Accepted Manuscript, 2014, 5 pages. Crystals after synthesis were filtered off by suction filtration. At this time, the crystal was washed with dimethylformamide as a synthetic solvent and then further washed with methanol. Next, the crystal was dried under reduced pressure at 120° C. for 3 hours, and then stored in N2 purged desiccator.

Mixing with 1-Butyl-3-Methylimidazolium Hexafluorophosphate (BMIM-PF$_6$)

To a 100 ml flask, 0.1 g of BMIM-PF$_6$ and 0.2 g of UIO-67 which had been activated as described above were charged, and methanol was further charged. Then, the mixture was diluted such that the total amount was 30 g. Then, the mixture was stirred for about 6 hours at room temperature to obtain a MOF/ionic liquid dispersion.

Film Formation on QCM

The MOF/ionic liquid dispersion obtained above was diluted with methanol and adjusted to have a concentration of 0.1 wt %. An appropriate amount of this solution was added dropwise on the upper Au electrode (5 mmϕ) of the QCM of a resonance frequency of 9 MHz with a micropipette, and then dried at 80° C. for 1 hour. As a result, the methanol was completely removed, and a MOF/ionic liquid composite film was formed on the QCM electrode. Then, in order to promote diffusion of the ionic liquid into MOF pores, heating was performed at 120° C. for 2 hours under reduced pressure, and cooling was performed at room temperature to obtain a molecular sensor of Example 1.

Similarly, a MOF alone was formed on the QCM electrode to obtain a molecular sensor of Comparative Example 1. Furthermore, an ionic liquid alone was formed on the QCM electrode to obtain a molecular sensor of Comparative Example 2.

(Gas Detection Experiment)

Using the molecular sensors of Example 1, Comparative Example 1 and Comparative Example 2, gas (borneol, the following formula) was detected.

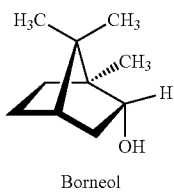

Borneol

These three types of molecular sensors were set in the detection chamber shown in FIG. 6, and an appropriate amount of borneol powder was put into the gas generator. A gas containing 0.75 ppm borneol was then generated using a laboratory atmosphere as a carrier gas at a flow rate of 1000 ml/min. The generated gas was sent over the molecular sensor, and the change in the oscillation frequency of the QCM was measured.

The results are shown in FIG. 10. A graph shown in FIG. 10 shows a change amount (Hz/(ppm·μg)) of a frequency of an oscillator when the value before a contact of each molecular sensor with the sample is 0.

The frequency change amount of the molecular sensor of Example 1 was 75 Hz/(ppm·μg). On the other hand, in Comparative Example 1, the frequency change amount was about 6.6 Hz/(ppm·μg), and in Comparative Example 2, the frequency change amount was 5.3 Hz/(ppm·μg). The change amount in Example 1 was about 10 times or more as compared with Comparative Examples 1 and 2, showing that the sensitivity was dramatically increased.

From the above results, it was shown that by using the sensitive film containing the porous member and the ionic liquid, the target molecule could be detected with higher sensitivity as compared with the case of using either one of them. In a MOF/ionic liquid composite sensitive film, it is considered that flow and diffusion due to the ionic liquid being a liquid are prevented by the complex with MOF, which contributes to stability of sensor characteristics.

(Manufacture 2 of MOF/Ionic Liquid Molecular Sensor)

Formation of MOF/Ionic Liquid Composite Thin Film

A UIO-67 thin film was formed with reference to Erika Virmani et al., J. Am. Chem. Soc. 2018, 140, 4812-4819. More specifically, 0.66 mmol (213 mg) of ZrOCl$_2$·8H$_2$O, 0.66 mmol (159 mg) of biphenyl dicarboxylic acid, 7.8 g of acetic acid, 94 g of dimethylformamide, and 11.7 mg and 117 mg weighing of respective dimethylformamide diluted solutions (0.1% by weight) of 1-butyl-3-methylimidazolium hexafluorophosphate (BMIM-PF$_6$) were mixed to obtain two kinds of raw material solutions, respectively. A mixture solution of 0.8 ml of acetic acid and 4.2 ml of dimethylformamide was put into a 100-ml glass container, and a 1-cm cubic Teflon (registered trademark) block was placed on the bottom of the container. Then, the QCM substrate was placed on an upper surface of the Teflon block. An appropriate amount of the raw material solution was dropped on the QCM substrate with a microsyringe. The glass container was calmly loaded in an oven, and heated at 100° C. for 3 hours. Further, the resultant was taken out of the glass container, and heated at 120° C. for 2 hours on a hot plate in the atmosphere, thus removing the excessive solvent and moisture. In this manner, while the raw material solution was drying in the solvent atmosphere, UIO-67 was formed by self-organization and at the same time, an ionic liquid (BMIM-PF$_6$) coexisted. The molecular formula of UIO-67 is represented by Zr$_6$O$_4$(OH)$_4$(C$_{14}$H$_8$O$_4$)$_6$, the theoretical weight of UIO-67 when the raw material reacted by 100% is assumed to be 234 mg. Therefore, in these cases, the mass ratios of the ionic liquid (BMIM-PF$_6$) to UIO-67 were 5×10$^{-5}$ and 5×10$^{-4}$, respectively. Thus, a molecular sensor of Example 2 having a mass ratio of 5×10$^{-5}$ and another molecular sensor of Example 3 having a mass ratio of 5×10$^{-4}$, were obtained. Further, a molecule sensor of Comparative Example 3 was obtained by forming a UIO-67 single film on the QCM electrode in a similar manner to the above except that the ionic liquid was not contained (that is, the mass ratio was 0).

(Gas Detection Test)

For each of the cases of the molecular sensors of Example 2 and Comparative Example 3, the detection of a gas (2-methyl isoborneol, which has a formula below) was carried out.

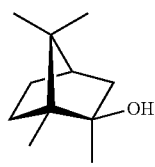

2-methyl isoborneol

Figure 11:
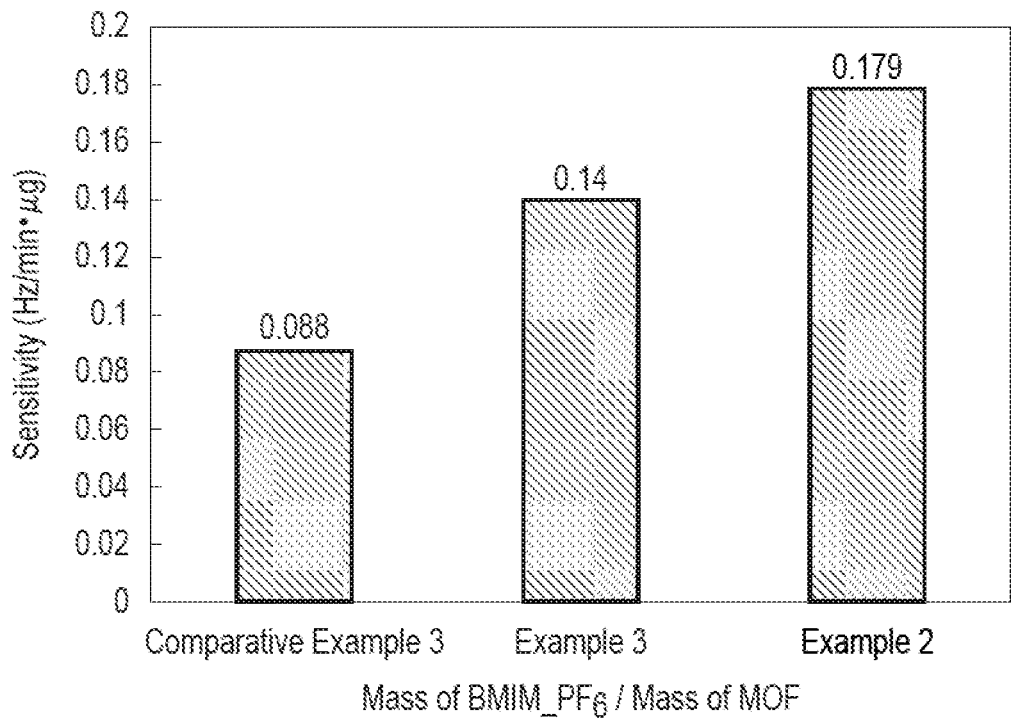
FIG. 11 is a graph showing results of 2-methylborneol detection experiments of Example 2, Example 3, and Comparative Example 3.

The three kinds of molecular sensors were set on sensing chamber shown in FIG. 6, and an appropriate amount of 2-methyl isoborneol powder was put into the gas generator. Then, by ventilating the atmosphere of the laboratory as a carrier gas at a flow rate of 200 ml/min, a gas containing an average of 54 ppb of 2-methyl isoborneol was generated. The generated gas was fed onto the molecular sensor, and the change in oscillation frequency of the QCM was measured. Since the frequency change of the QCM was very slow, it was evaluated in terms of the frequency change per unit time. The graph of FIG. 11 indicates the change ratio (Hz/(min·μg)) of the frequency per unit weight of the MOF film in each molecular sensor.

The frequency change rate of the molecular sensor of Example 2 was 0.140 Hz/(min·μg), and the frequency change rate of the molecular sensor of Example 3 was 0.179 Hz/(min·μg). On the other hand, the change rate in frequency of Comparative Example 3 was 0.088 Hz/(min·μg). The present embodiment exhibited an effect of improving the sensitivity at very slight amount of $5\times10^{-5}$ or $5\times10^{-4}$, by mass ratio to MOF. The reason for this is considered that the ionic liquid exists not inside but on the surface of the MOF, and thus the initial action of the 2-MIB molecular adsorption was promoted.

(Manufacture 1 of COF/Ionic Liquid Molecular Sensor)

Synthesis of COF-LZU1

COF-LZU1 was synthesized with reference to Yongwu Peng et al., "Room Temperature Batch and Continuous Flow Synthesis of Water-Stable Covalent Organic Frameworks (COFs)", Chemistry of Materials (28, 14), 2016, pp. 5095-5101. Crystals after synthesis were filtered off by suction filtration. At this time, the crystal was washed with anhydrous THF, anhydrous acetone, and anhydrous dichloromethane, dried under reduced pressure at 120° C. for 3 hours, and then stored in N2 purged desiccator.

Mixing with BMIM-PF$_6$

To a 100 ml flask, 0.1 g of BMIM-PF$_6$ and 0.2 g of COF-LZU1 which had been activated as described above were charged, and methanol was further charged. Then, the mixture was diluted such that the total amount was 30 g. Then, the mixture was stirred for about 6 hours at room temperature to obtain a COF/ionic liquid dispersion.

Film Formation on QCM

The COF/ionic liquid dispersion obtained above was diluted with methanol and adjusted to have a concentration of 0.1 wt %. An appropriate amount of this solution was added dropwise on the upper Au electrode (5 mmϕ) of the QCM of a resonance frequency of 9 MHz with a micropipette, and then dried at 80° C. for 1 hour. As a result, the methanol was completely removed, and a COF/ionic liquid composite film was formed on the QCM electrode. Then, in order to promote diffusion of the ionic liquid into COF pores, heating was performed at 120° C. for 2 hours under reduced pressure, and cooling was performed at room temperature to obtain a molecular sensor of Example 4.

Similarly, a MOF alone was formed on the QCM electrode to obtain a molecular sensor of Comparative Example 4. Furthermore, an ionic liquid alone was formed on the QCM electrode to obtain a molecular sensor of Comparative Example 5.

(Gas Detection Experiment)

Using the molecular sensors of Example 4, Comparative Example 4 and Comparative Example 5, gases (ethanol and ethyl acetate) were detected. These three types of molecular sensors were set in the detection chamber shown in FIG. 6, and an appropriate amount of ethanol or ethyl acetate was put into the gas generator. Gases containing 426 ppm ethanol at maximum and 192 ppm ethyl acetate at maximum, respectively, were then generated using a laboratory atmosphere as a carrier gas at a flow rate of 200 ml/min. The generated gas was sent over the molecular sensor, and the change in the oscillation frequency of the QCM was measured.

Figure 12:
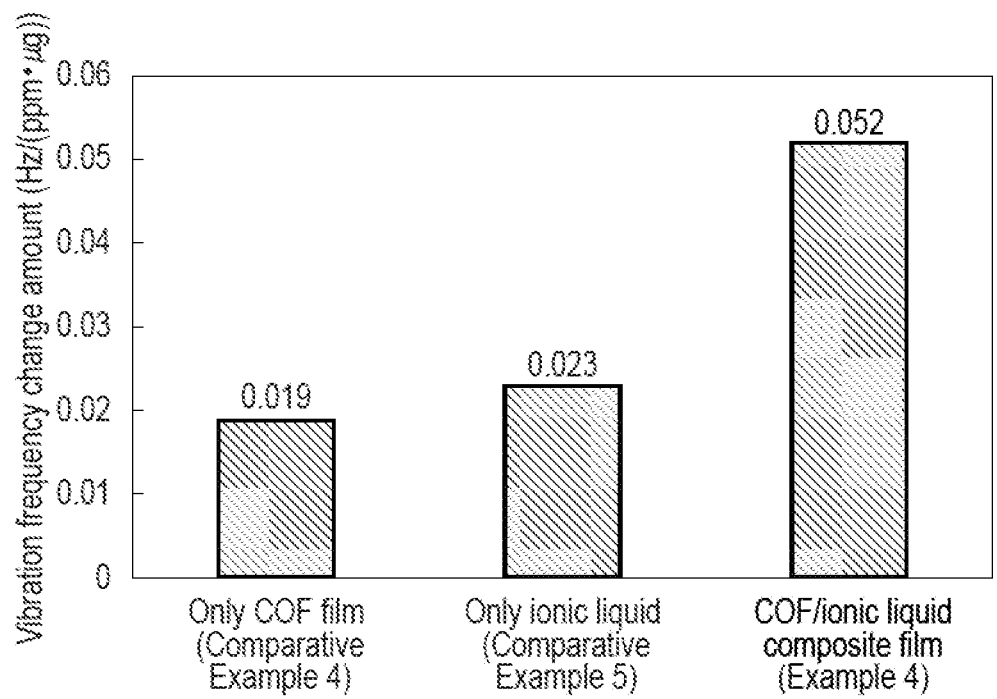
FIG. 12 is a graph showing results of ethanol detection experiments of Example 4, Comparative Example 4, and Comparative Example 5.

The results for ethanol are shown in FIG. 12, and the results for ethyl acetate are shown in FIG. 13. Each graph shows the change amount (Hz/(ppm·μg)) of the frequency of the oscillator per unit weight of sensitive film when the value before the contact of each molecular sensor with the sample is 0.

In ethanol, the frequency change amount of the molecular sensor of Example 4 was 0.052 Hz/(ppm·μg). In Comparative Example 4, the frequency change amount was 0.019 Hz/(ppm·μg), and in Comparative Example 5, the frequency change amount was 0.023 Hz/(ppm·μg). In ethyl acetate, the change amount of the molecular sensor of Example 4 was 0.085 Hz/(ppm·μg). In Comparative Example 4, the change amount was 0.013 Hz/(ppm·μg), and in Comparative Example 5, the change amount was 0.039 Hz/(ppm·μg). The change amount in Example 4 was about 2.7 times and about 2.3 times as compared with Comparative Example 4, and about 6.5 times and about 2.2 times as compared with Comparative Example 5, showing that the sensitivity was increased.

From the above results, it was shown that by using the sensitive film containing the porous member and the ionic liquid, the target molecule could be detected with higher sensitivity as compared with the case of using either one of them. In a COF/ionic liquid composite sensitive film, it is considered that flow and diffusion due to the ionic liquid being a liquid are prevented by the complex with COF, which contributes to stability of sensor characteristics.

(Manufacture 2 of COF/Ionic Liquid Molecule Sensor)

Surface Treatment of QCM Substrate

A QCM of a resonance frequency of 9 MHz was ultrasonically cleaned for ten minutes in ethanol and then for ten minutes in methanol, and further it was immersed in a methanol solution (0.3 g/L) of 16-mercaptohexadeconic acid for three days, and then was modified on an Au electrode.

Forming of COF-LZU1 Film on QCM 32 mg of 1,3,5-triformylbenzene and 32 mg of p-phenylene diamine were dissolved in 20 g of 1,4-dioxane, and thus a raw material solution was prepared. A surface-treated QCM substrate was placed in a center portion of a glass petri dish. Then, an appropriate amount of the raw material solution was added dropwise on the Au electrode of the QCM with a microsyringe. After that, several drops of 3 mol/L-acetic acid was added dropwise to an outer periphery of the QCM substrate in the petri dish, and the glass petri dish was closed with a cap. Then, the resultant was dried at room temperature under acetic acid steam condition and it was taken out of the petri dish and further dried by heating on a hot plate for at 120° C. for 2 hours. Next, the QCM substrate was cleaned in methanol for two minutes to remove unreacted raw materials and crystals of large particle sizes, and thus a COF-LZU1 film was obtained. Further, the film was dried under reduced pressure at 120° C. for 3 hours, and thereafter it was stored in N2 purged desiccator.

Preparation of Ionic Liquid Diluted Solution

As the ionic liquids, 1-butyl-4-methylimidazolium hexafluorophosphate (BMIM-PF$_6$), 1-ethyl-3-methylpyridinium ethylsulphate (EMPy-ES), 1-ethyl-3-hydroxymethylpyridinium ethylsulphate (EHMPy-ES) were prepared, and they were each diluted with a mixed solvent of methanol and acetone (volume ratio 1:1). Thus, 0.05 wt % solutions were prepared.

Addition of Ionic Liquid to COF-LZU1 Film on QCM

Appropriate amounts of the ionic liquid diluted solutions prepared as above were each added dropwise by microsyringes on COF-LZU1 films, respectively while monitoring the change in oscillation frequency of the QCM for each case. Then, in each case, the resultant was heated at 120° C. for 2 hours under reduced pressure to promote the evaporation of the solvent and the diffusion into pores of the COF of the respective ionic liquid, and then it was cooled with room temperature. Thus, molecular sensors of Example 5 were obtained. Here, the amount of BMPy-PF$_6$ to the COF-LZU1 film was 0.83 in mass ratio, the amount of EMPy-ES was 0.74 in mass ratio, and the amount of EHMPy-ES was 1.04 in mass ratio.

(Gas Detection Experiments)

Using the molecular sensors of Example 5, gases (ethanol, ethylacetate and toluene) were detected. The three kinds of molecular sensors were set in the detection chamber shown in FIG. 6, and an appropriate amount of ethanol, ethylacetate or toluene was put into the gas generator. Then, using a laboratory atmosphere as carrier gas at a flow rate of 200 ml/min, a gas containing 227 ppm of ethanol at maximum, a gas containing 151 ppm of ethylacetate at maximum, and a gas containing 73 ppm of toluene at maximum were generated. The generated gases were sent into the molecular sensors, and the change in oscillation frequency of QCM was measured for each case.

Figure 15:
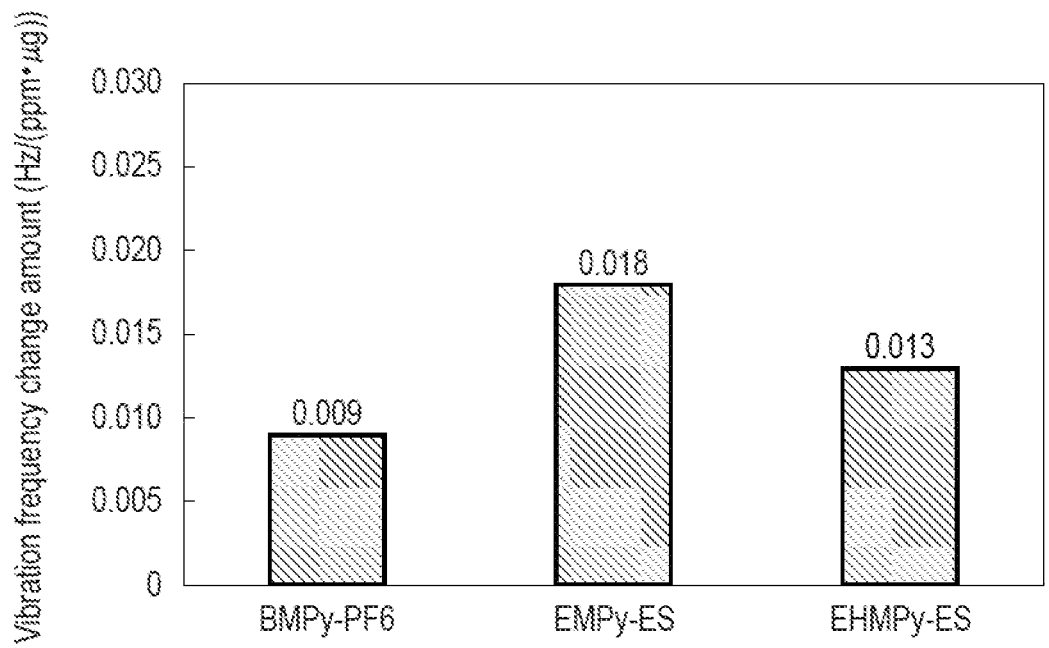
FIG. 15 is a graph showing results of ethyl acetate detection experiments of Example 5.
Figure 16:
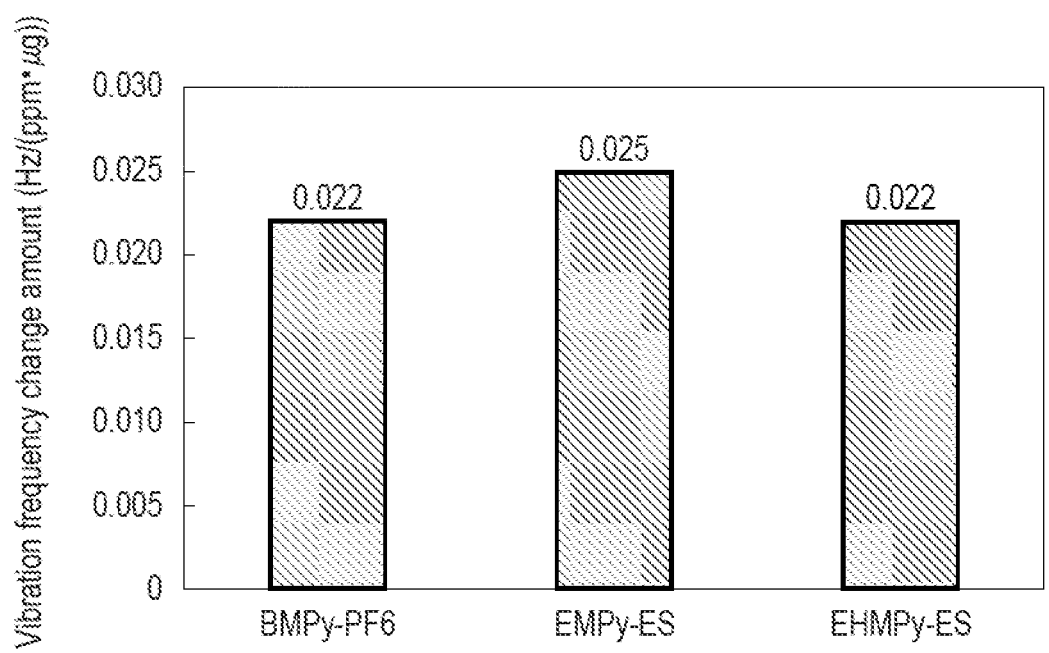
FIG. 16 is a graph showing results of toluene detection experiments of Example 5.

FIG. 14 shows results of the case of ethanol, FIG. 15 shows results of the case of ethylacetate and FIG. 16 shows results of the case of toluene. Each graph shows the amount of change (Hz/(ppm·μg)) of the frequency per unit weight of the sensitive film of the oscillator when the amount before contact of the sample in each molecular sensor was assumed to be 0.

In the case of ethanol, the amount of change in frequency of the molecular sensor using BMPy-PF$_6$ of Example 5 was 0.010 Hz/(ppm·μg), the amount of change in frequency of the molecular sensor using EMPy-ES was 0.028 Hz/(ppm·μg), the amount of change in frequency of the molecular sensor using EHMPy-ES was 0.021 Hz/(ppm·μg). In the case of ethylacetate, the amount of change in frequency of the molecular sensor using BMPy-PF$_6$ of Example 5 was 0.009 Hz/(ppm·μg), the amount of change in frequency of the molecular sensor using EMPy-ES was 0.018 Hz/(ppm·μg) and the amount of change in frequency of the molecular sensor using EHMPy-ES was 0.013 Hz/(ppm·μg). In the case of toluene, the amount of change in frequency of the molecular sensor using BMPy-PF$_6$ of Example 5 was 0.022 Hz/(ppm·μg), the amount of change in frequency of the molecular sensor using EMPy-ES was 0.025 Hz/(ppm·μg) and the amount of change in frequency of the molecular sensor using EHMPy-ES was 0.022 Hz/(ppm·μg).

From the above-provided results, it was found that the molecule sensors using the sensitive films containing three kinds of different ionic liquids respectively exhibit different sensitivities to the gases of ethanol, ethylacetate and toluene, respectively. That is, it was demonstrated possible to detect and distinct gas by pattern recognition based on the kinds and amounts of coexisting ionic liquids.

While certain embodiments have been described, these embodiments have been presented by way of example only, and are not intended to limit the scope of the inventions. Indeed, the novel embodiments described herein may be embodied in a variety of other forms; furthermore various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A molecular sensor comprising a sensitive film in which a porous member and an ionic liquid coexist,
   wherein the molecular sensor is capable of detecting a target molecule by measuring a change in physical quantity of the sensitive film, and
   the change is due to adsorption of the target molecule to the sensitive film.

2. The molecular sensor of claim 1, wherein the ionic liquid is held by the porous member.

3. The molecular sensor of claim 1, wherein the porous member is a metal organic framework (MOF).

4. The molecular sensor of claim 3, wherein the metal organic framework has a structure in which 12 dicarboxylic acids coordinate to a hexanuclear $Zr_6O_4(OH)_4$ cluster.

5. The molecular sensor of claim 4, wherein the metal organic framework is at least one of UIO-66, UIO-67, UIO-68, and derivatives thereof.

6. The molecular sensor of claim 1, wherein the porous member is a covalent organic framework (COF).

7. The molecular sensor of claim 6, wherein the covalent organic framework has at least one of an imine bond, an azine bond, an enamine bond, a hydrazone bond, and an imide bond, obtained by a condensation reaction between a ligand having an amino group and a ligand having an aldehyde group or a carbonyl group.

8. The molecular sensor of claim 6, wherein the covalent organic framework has at least one of COF-LZU1, COF-300, TAPB-PDA-COF, COF-TpPa-1, DAAQ-TFP-COF, N$_3$-COF, ACOF-1, COF-42, COF-43, PI-COF-1, PI-COF-2, PI-COF-3, PI-COF-4, and PI-COF-5.

9. The molecular sensor of claim 1, further comprising a temperature adjustment device configured to heat the sensitive film.

10. The molecular sensor of claim 1, wherein
    a ratio of the ionic liquid to the porous material in the sensitive film is $5 \times 10^{-5}$ to 3 in weight ratio.

11. A molecular detection device configured to detect a target molecule, comprising a molecular sensor comprising a sensitive film in which a porous member and an ionic liquid coexist and a detection unit configured to measure a change in physical quantity of the sensitive film, and
    the change is due to adsorption of the target molecule to the sensitive film.

12. The device of claim 11, wherein the ionic liquid is held by the porous member.

13. The device of claim 11, wherein the detection unit comprises any one of measurement mechanisms using a quartz crystal microbalance (QCM), surface acoustic wave (SAW), and a micro cantilever (MCL).

14. The device of claim 11, wherein the molecular detection device comprises a plurality of the molecular sensors, and the molecular sensors include at least sensors in which combinations and/or amount ratios of the porous member and the ionic liquid of the sensitive film are different from each other.

15. The device of claim 14, further comprising a processing device, wherein the processing device is configured to determine a type and/or amount of the target molecule by combining a plurality of change amounts of the physical quantities obtained from the respective molecular sensors and recognizing the combined change amounts as a pattern.

16. The device according to claim 11, further comprising a temperature adjustment device configured to heat the sensitive film.

17. A target molecule detection method comprising:

bringing a target molecule into contact with a sensitive film in which a porous member and an ionic liquid coexist;

measuring a change in physical quantity of the sensitive film due to adsorption of the target molecule to the sensitive film; and determining a type or amount of the target molecule from a result of the measurement.

18. The method of claim 17, wherein the ionic liquid is held by the porous member.

19. The method of claim 17, wherein the porous member is a metal organic framework (MOF) or a covalent organic framework (COF).

20. The method of claim 17, wherein the porous member is a covalent organic framework (COF).

21. The method of claim 17, wherein the bringing the target molecule into contact with the sensitive film and the measuring are performed using a plurality of the sensitive films in which combinations and/or amount ratios of the porous member and the ionic liquid are different from each other, and in the determining, a type and/or amount of the target molecule is determined by combining change amounts of the physical quantities of the sensitive films and recognizing the combined change amounts as a pattern.

22. The method of claim 17, further comprising heating the sensitive film after the measuring to remove the target molecule from the sensitive film.

* * * * *